United States Patent
Kress et al.

(10) Patent No.: US 11,933,940 B1
(45) Date of Patent: Mar. 19, 2024

(54) MATERIALS FOR METALENSES, THROUGH-WAVEGUIDE REFLECTIVE METASURFACE COUPLERS, AND OTHER METASURFACES

(71) Applicant: Imagia, Inc., Las Vegas, NV (US)

(72) Inventors: Gregory Kress, Las Vegas, NV (US); Heydar Honarvar Nazari, Fremont, CA (US); Arindom Datta, Fremont, CA (US); Erik Shipton, Kirkland, WA (US); Abdoulaye Ndao, Brookline, MA (US)

(73) Assignee: Imagia, Inc., Las Vegas, NV (US)

( * ) Notice: Subject to any disclaimer, the term of this patent is extended or adjusted under 35 U.S.C. 154(b) by 0 days.

(21) Appl. No.: 18/467,583

(22) Filed: Sep. 14, 2023

Related U.S. Application Data

(60) Provisional application No. 63/375,606, filed on Sep. 14, 2022.

(51) Int. Cl.
*G02B 1/00* (2006.01)

(52) U.S. Cl.
CPC .................................. *G02B 1/002* (2013.01)

(58) Field of Classification Search
CPC .......... G02B 1/00; G02B 1/002; G02B 1/005; G02B 1/007; G02B 27/0172; G02B 6/122; G02B 6/24; G02B 6/10; G02B 6/102; G02B 6/105; G02B 6/107
See application file for complete search history.

(56) References Cited

U.S. PATENT DOCUMENTS

| | | | |
|---|---|---|---|
| 5,132,839 A | 7/1992 | Travis | |
| 10,979,635 B2 | 4/2021 | Hu | |
| 11,029,529 B2 | 6/2021 | Chou | |
| 11,054,660 B2 | 7/2021 | Urzhumov | |
| 11,747,446 B1 * | 9/2023 | Uthoff | G02F 1/31 359/315 |
| 11,796,818 B2 | 10/2023 | Lin | |

(Continued)

FOREIGN PATENT DOCUMENTS

| | | |
|---|---|---|
| EP | 3872538 A2 | 9/2021 |
| JP | 2005182073 A | 7/2005 |

(Continued)

OTHER PUBLICATIONS

Hsu et al., Review of Metasurfaces and Metadevices: Advantages of Different Materials and Fabrications, (Jun. 8, 2022), Nanomaterials, 1-24 (Year: 2022).*

(Continued)

*Primary Examiner* — Ephrem Z Mebrahtu
(74) *Attorney, Agent, or Firm* — PCFB, LLC; Justin K. Flanagan

(57) ABSTRACT

Systems and methods are described herein for manufacturing high-index, low-absorption materials for use in visible light optical metasurfaces. Methods of manufacturing or forming hydrogenated amorphous silicon (a-Si:H), silicon-rich nitride (SRN), and hydrogenated silicon-rich nitride (SRN:H) are described herein that exhibit high indices of refraction and low extinction coefficients for visible wavelengths of optical radiation. Optical metasurfaces, including optical metalenses and waveguide couplers, are described herein that utilize the a-Si:H, SRN, and/or SRN:H materials.

15 Claims, 21 Drawing Sheets

(56) References Cited

U.S. PATENT DOCUMENTS

| | | | |
|---|---|---|---|
| 11,874,476 | B1 | 1/2024 | Kress |
| 2009/0109518 | A1 | 4/2009 | Atkin |
| 2012/0312969 | A1 | 12/2012 | Leonhardt |
| 2014/0043846 | A1 | 2/2014 | Yang |
| 2018/0045953 | A1 | 2/2018 | Fan |
| 2018/0052501 | A1 | 2/2018 | Jones, Jr. |
| 2018/0157058 | A1 | 6/2018 | Chou |
| 2018/0252857 | A1* | 9/2018 | Glik .................... G02B 6/00 |
| 2018/0322845 | A1 | 11/2018 | Machida |
| 2019/0121004 | A1 | 4/2019 | Ahmed |
| 2019/0154877 | A1 | 5/2019 | Capasso |
| 2019/0196068 | A1 | 6/2019 | Tsai |
| 2019/0309925 | A1 | 10/2019 | Keh |
| 2020/0096672 | A1 | 3/2020 | Yu |
| 2020/0135703 | A1 | 4/2020 | Ahmed |
| 2020/0225386 | A1 | 7/2020 | Tsai |
| 2020/0259307 | A1 | 8/2020 | Sharma |
| 2020/0264343 | A1 | 8/2020 | Han |
| 2021/0044748 | A1 | 2/2021 | Hu |
| 2021/0306564 | A1 | 9/2021 | Hu |
| 2021/0405255 | A1 | 12/2021 | Kress |
| 2022/0137258 | A1 | 5/2022 | Bartlett |
| 2022/0283378 | A1 | 9/2022 | Waldem |
| 2022/0385042 | A1 | 12/2022 | Devlin |
| 2023/0014285 | A1 | 1/2023 | Kante |
| 2023/0062193 | A1 | 3/2023 | Han |
| 2023/0075868 | A1 | 3/2023 | Kress |
| 2023/0081415 | A1 | 3/2023 | Hsu |
| 2023/0221462 | A1* | 7/2023 | Sun .................... G02B 1/002 359/566 |
| 2023/0280499 | A1 | 9/2023 | Hao |
| 2023/0375841 | A1 | 11/2023 | Kress |
| 2023/0384499 | A1* | 11/2023 | Klug ............... G02B 27/0172 |

FOREIGN PATENT DOCUMENTS

| | | | |
|---|---|---|---|
| KR | 2143535 B1 * | 8/2020 | |
| KR | 2262913 B1 * | 6/2021 | |
| WO | 2016140720 A2 | 6/2016 | |
| WO | 2017176921 A1 | 10/2017 | |
| WO | 2019125306 A1 | 6/2019 | |
| WO | 2020101568 A1 | 5/2020 | |
| WO | 2022005847 A1 | 1/2022 | |
| WO | 2022051971 A1 | 3/2022 | |
| WO | 2022183094 A1 | 9/2022 | |

OTHER PUBLICATIONS

Chen, et al., "Special Issue on Transformation Optics," Journal of Optics, 2016, 040201, 3 pp, DOI: 10.1088/2040-8978/18/4/040201, IOP Publishing Ltd.

Cummer, et al., "Material Parameters and Vector Scaling in Transformation Acoustics," New Journal of Physics, Nov. 27, 2008, vol. 10, 12 pp, IOP Publishing Ltd. and Deutsche Physikalische Gesellschaft, www.njp.org.

Hunt, et al., "Broadband Wide Angle Lens Implemented with Dielectric Metamaterials," Sensors, Aug. 12, 2011, vol. 11, p. 7982-7991; DOI: 10.3390/s110807982, MDPI, Basel, Switzerland, www.mdpi.com/journal/sensors.

Hunt, et al., "Perfect Relay Lens at Microwave Frequencies Based on Flattening a Maxwell Lens," Journal of the Optical Society of America B, Aug. 2011, vol. 28, No. 8, p. 2025-2028, Optical Society of America, www.osapublishing.org.

Hunt, et al., "Transformation Optics Compressed Rotman Lens Implemented with Complementary Metamaterials," Proceedings of the Society of Photo-Optical Instrumentation Engineers (SPIE), 2010, vol. 8021, 7 pp, DOI:10.1117/12.884319, Radar Sensor Technology XV, www.spiedigitallibrary.org.

Joo, et al., Metasurface-driven OLED displays beyond 10,000 pixels per inch, Science Magazine, Oct. 23, 2020, downloaded from http://science.sciencemag.org on Oct. 26, 2020, pp. 459-463.

Kundtz, et al., "Electromagnetic Design with Transformation Optics," Proceedings of the IEEE, Oct. 2011, vol. 99, No. 10, p. 1622-1633, DOI: 10.1109/JPROC.2010.2089664, IEEE.

Kundtz, et al., "Extreme-Angle Broadband Metamaterial Lens," Nature Materials, Feb. 2010, vol. 9, p. 129-132, Macmillan Publishers Ltd., www.nature/com/naturematerials.

Landy, et al., "Approaches to Three-Dimensional Transformation Optical Media Using Quasi-Conformal Coordinate Transformations," arXiv:1007.4363 v1 [physics.optics], Jul. 26, 2010, www.arxiv.org/abs/1007.4363.

Paul, et al., "Construction of Invisibility Cloaks of Arbitrary Shape and Size Using Planar Layers of Metamaterials," AIP: Journal of Applied Physics, Jun. 20, 2012, vol. 111, 9 pp, 123106; DOI: 10.1063/1.4729012, American Institute of Physics, dx.doi.org/10.1063/1.4729012.

PCT International App. No. PCT/US2019/058332, International Search Report dated Feb. 21, 2020, 5 pp.

PCT International Patent Application PCT/US2021/038697, International Search Report and Written Opinion dated Nov. 26, 2021, 13 pp.

PCT International Patent Application PCT/US2022/018083, International Search Report and Written Opinion dated Jul. 26, 2022, 10 pp.

PCT International Patent Application PCT/US2023/062777, Invitation to Pay Additional Fees mailed Jul. 31, 2023, 2 pp.

Popa, et al., "Design of Layered Transformation-Optics Devices of Arbitrary Shape," Physical Review A, Sep. 30, 2010, vol. 82, 5 pp, 033837, DOI: 10.1103/PhysRevA.82.033837, The American Physical Society, journals.aps.org/pra/abstract/10.1103/PhysRevA.82.033837.

Rahm, et al., "Design of Adaptive Optics by Finite Embedded Coordinate Transformations," 2008, psu.edu.

Rahm, et al., "Design of Electromagnetic Cloaks and Concentrators Using Form-Invariant Coordinate Transformations of Maxwell's Equations," Photonics and Nanostructures—Fundamentals and Applications, Aug. 8, 2007, vol. 6, p. 87-95, DOI.1016/j.photonics.2007.07.013, Elsevier B. V., elsevier.com/locate/photonics.

Rahm, et al., "Optical Design of Reflectionless Complex Media by Finite Embedded Coordinate Transformations," arXiv:0711.1846 v.2 [physics.optics], Dec. 4, 2007, www.arxiv.org/abs/0711.1846.

Roberts, et al., "Optical Lens Compression Via Transformation Optics," Optics Express, Sep. 14, 2009, vol. 17, No. 19, p. 16535-16542, Optical Society of America, www.osapublishing.org.

Schurig, "An Aberration-Free Lens with Zero F-Number," New Journal of Physics, Nov. 27, 2008, 11, vol. 10, IOP Publishing Ltd and Deutsche Physikalische Gesellschaft, www.njp.org.

Schurig, et al., "Calculation of Material Properties and Ray Tracing in Transformation Media," Optics Express, Oct. 16, 2006, vol. 14, No. 21, p. 9794-9804, Optical Society of America, www.osapublishing.org.

Schurig, et al., "Transformation-Designed Optical Elements," Optics Express, Oct. 29, 2007, vol. 15, No. 22, 11 pp, Optical Society of America, www.osapublishing.org.

Shin, et al., "A Versatile Smart Transformation Optics Device with Auxetic Elasto-Electromagnetic Metamaterials," Scientific Reports, Feb. 13, 2014, 4:4084, DOI: 10.1038/srep04084, www.nature.com/scientificreports.

Shin, et al., "Broadband Electromagnetic Cloaking with Smart Metamaterials," Nature Communications, Nov. 20, 2012, 3.1213, DOI: 10.1038/ncomms2219, Macmillan Publishers Ltd., www.nature.com/naturecommunications.

Smith, et al., "Enhancing Imaging Systems Using Transformation Optics," Optics Express, Sep. 22, 2010, vol. 18, No. 20, p. 21238-21251, Optical Society of America, www.osapublishing.org.

U.S. Appl. No. 18/170,549, Non-Final Office Action dated Sep. 1, 2023, 11 pp.

U.S. Appl. No. 18/342,007, Non-Final Office Action dated Sep. 14, 2023, 12 pp.

Urzhumov, et al., "Cross-Section Comparisons of Cloaks Designed by Transformation Optical and Optical Conformal Mapping Approaches," Journal of Optics, Nov. 16, 2010, vol. 13, 12 pp, 024002; DOI: 10.1088/2040-8978/13/2/024002, IOP Publishing Ltd., stacks.iop.org12/024002.

(56) References Cited

OTHER PUBLICATIONS

Urzhumov, et al., "Low-Loss Directional Cloaks Without Superluminal Velocity or Magnetic Response," Optics Letters, Nov. 1, 2012, vol. 37, No. 21, p. 4471-4473, Optical Society of America, www.osapublishing.org.
Urzhumov, et al., "Transformation Optics with Photonic Band Gap Media," Phys. Rev. Lett. 105, 163901, arXiv:1007.3227 [physics.optics], Jul. 19, 2010, 4 pp, www.arxiv.org/abs/1007.3227.
Werner, et al., "Transformation Electromagnetics and Metamaterials—Fundamental Principles and Applications," 2014, 499 pp, Springer-Verlag, London.
U.S. Appl. No. 18/451,031, Non-Final Office Action dated Oct. 18, 2023, 16 pp.
U.S. Appl. No. 17/682,085, Non-Final Office Action dated Jan. 17, 2024, 11 pp.

\* cited by examiner

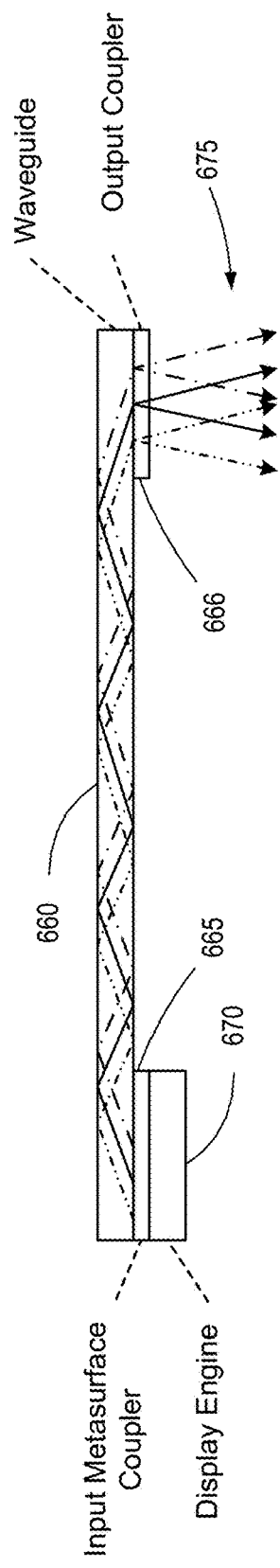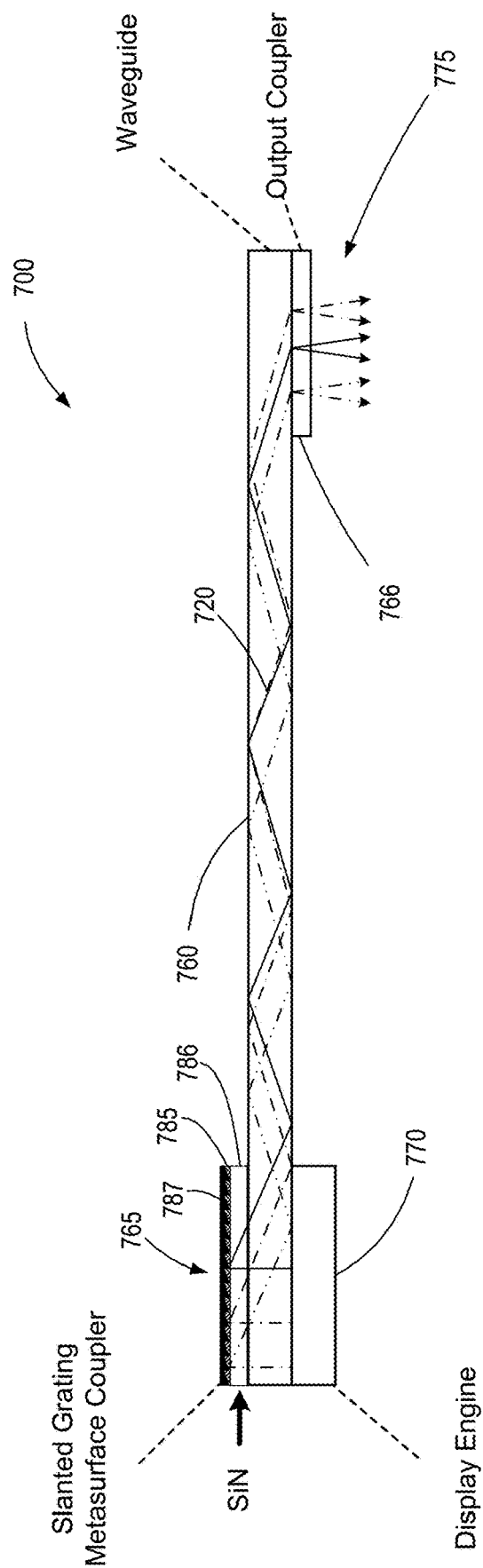
FIG. 6
FIG. 7

| Annealed Poly Silicon | | | |
|---|---|---|---|
| Wavelength (nm) | 490 | 535 | 650 |
| n | 4.396081 | 4.165514 | 3.849168 |
| k | 0.2108867 | 0.1278637 | 0.04579883 |

| Hydrogenated Amorphous Silicon (a-Si:H) | | | |
|---|---|---|---|
| Wavelength (nm) | 490 | 535 | 650 |
| n | 3.784 | 3.65 | 3.3485 |
| k | 0.082 | 0.01 | 0.0025 |

| System | Depo Temperature (°C) | Time (min) | SiH4 (sccm) | H2 (sccm) | Pressure (mT) | Power (W) | Substrate | Th oxd thickness (Å) | a-Si thickness (Å) | N@650 nm | K@650 nm | N@485 nm | K@485 nm | goodness of fit (%) |
|---|---|---|---|---|---|---|---|---|---|---|---|---|---|---|
| PECVD3 | 150 | 50 | 10 | 90 | 1500 | 40 | TOX | 955 | 2087 | 3.362 | 0.002 | 3.784 | 0.082 | 94.96 |
| PECVD4 | 150 | 45 | 10 | 150 | 1500 | 40 | TOX | 1473 | 1832 | 3.375 | 0.0195 | 3.794 | 0.095 | 97.02 |

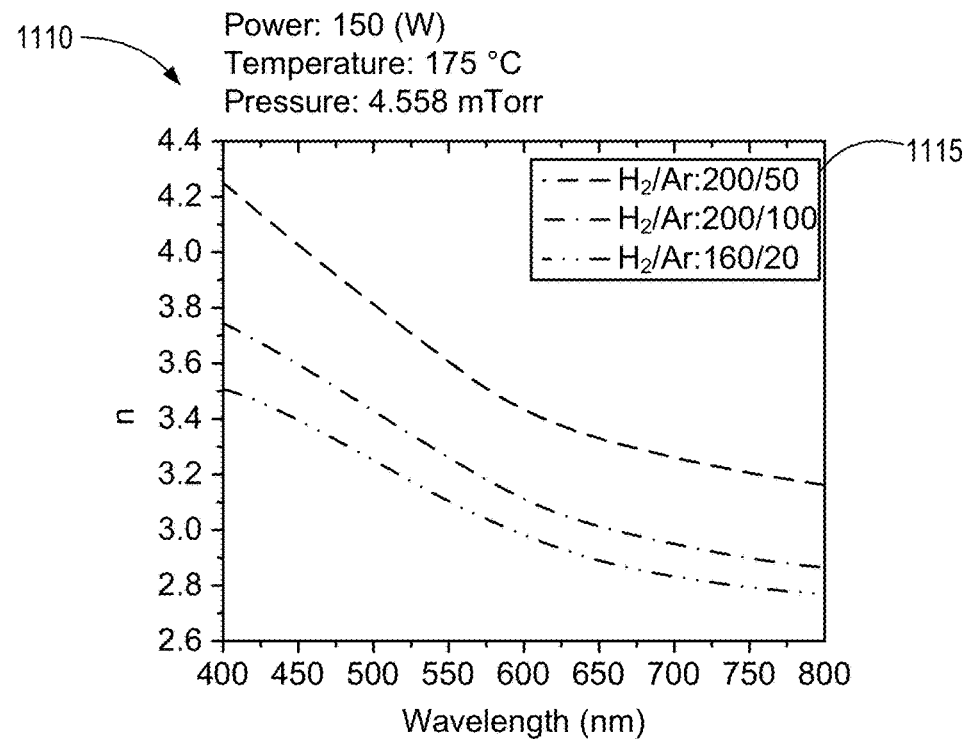
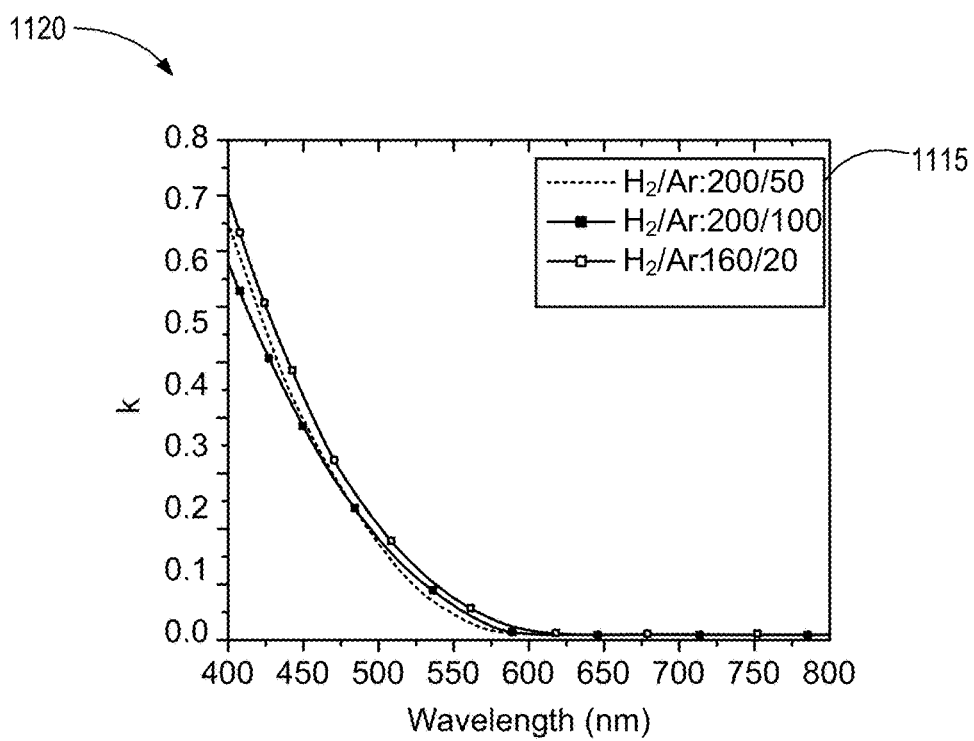
FIG. 11A

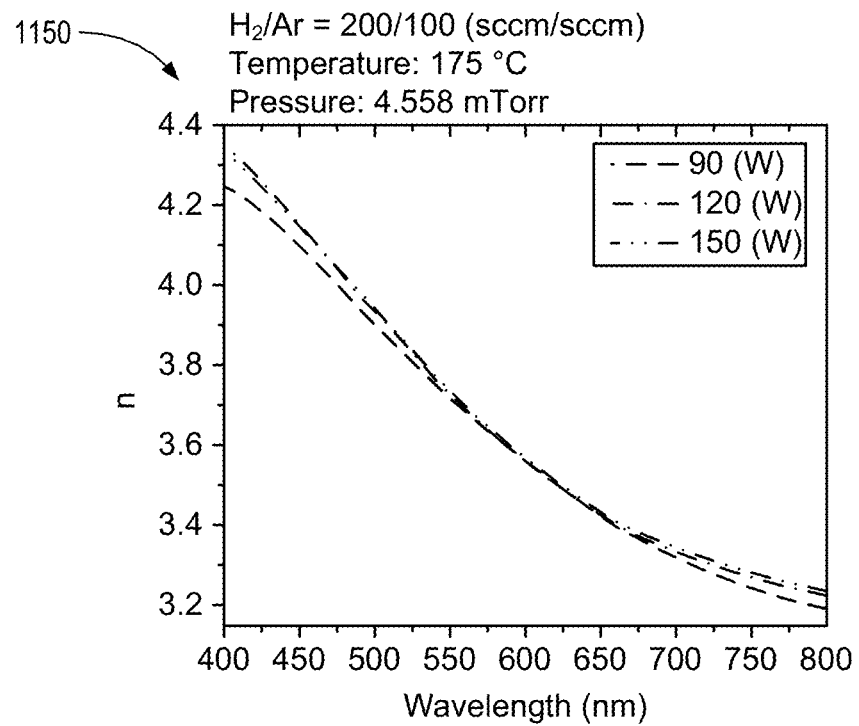
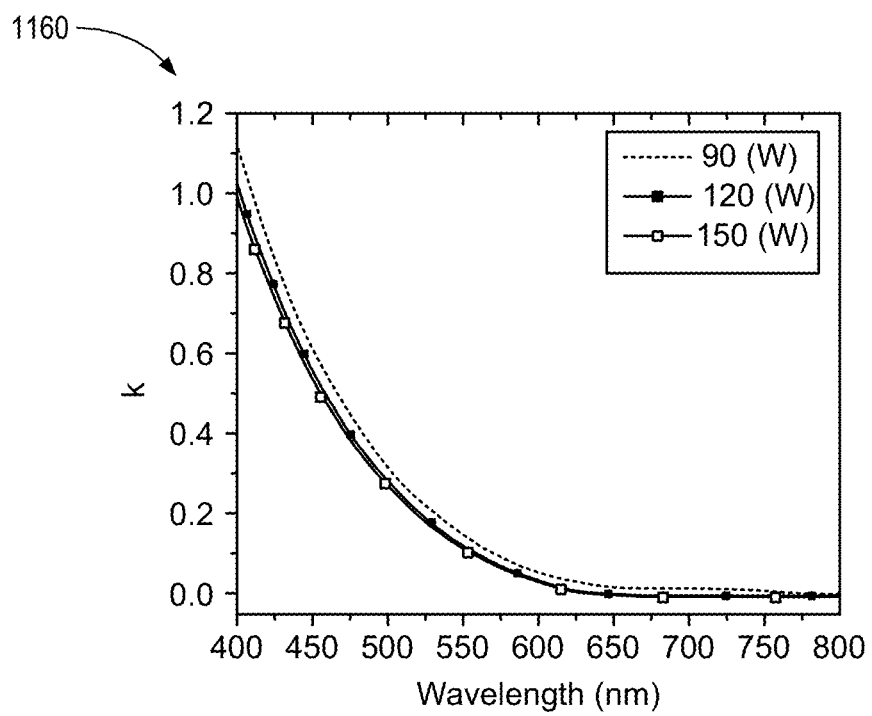
FIG. 11B

SRN:H Deposition by Nitrogen (Ammonia-less)

| Sample | Power (W) | Time (min) | SiH₄ (sccm) | H₂ (sccm) | N₂ (sccm) | Ar (sccm) | NH₃ (sccm) | Pressure mTorr | Thickness (nm) | n@650nm | k@650nm | GoF |
|---|---|---|---|---|---|---|---|---|---|---|---|---|
| Run 1 | 200 | 5 | 50 | 0 | 450 | 500 | 0 | 1500 | 3161 | 1.6492 | 0 | 96.54 |
| Run 2 | 200 | 5 | 50 | 0 | 300 | 500 | 0 | 1500 | 3298 | 1.6603 | 0 | 97.17 |
| Run 3 | 200 | 5 | 50 | 100 | 300 | 500 | 0 | 1500 | 3695 | 1.8479 | 0 | 99.96 |
| Run 4 | 200 | 5 | 50 | 200 | 300 | 500 | 0 | 1500 | 3730 | 1.9637 | 0 | 99.96 |
| Run 5 | 200 | 5 | 50 | 200 | 200 | 500 | 0 | 1500 | 3743 | 2.0085 | 0 | 99.95 |
| Run 6 | 200 | 5 | 50 | 200 | 150 | 500 | 0 | 1500 | 3578 | 2.2429 | 0 | 99.23 |
| Run 7 | 250 | 5 | 50 | 200 | 150 | 500 | 0 | 1500 | 3562 | 2.4175 | 0 | 98.63 |
| Run 8 | 300 | 5 | 50 | 200 | 150 | 500 | 0 | 1500 | 3525 | 2.5811 | 0 | 98.09 |

FIG. 16

SRN:H Deposition by Ammonia

| Sample | Power (W) | Time (min) | SiH$_4$ (sccm) | H$_2$ (sccm) | N$_2$ (sccm) | Ar (sccm) | NH$_3$ (sccm) | Pressure mTorr | Thickness (nm) | n@650nm | k@650nm | GoF |
|---|---|---|---|---|---|---|---|---|---|---|---|---|
| Run 1 | 20 | 5 | 35 | 0 | 1000 | 0 | 21 | 800 | 606 | 1.8218 | 0 | 99.98 |
| Run 2 | 20 | 5 | 35 | 0 | 1000 | 0 | 21 | 800 | 1560 | 1.8531 | 0 | 99.98 |
| Run 3 | 20 | 10 | 35 | 0 | 1000 | 0 | 14 | 800 | 3167 | 1.8620 | 0 | 99.94 |

FIG. 18

MATERIALS FOR METALENSES, THROUGH-WAVEGUIDE REFLECTIVE METASURFACE COUPLERS, AND OTHER METASURFACES

RELATED APPLICATIONS

This application claims benefit under 35 U.S.C. § 119 and priority to U.S. Provisional Patent Application No. 63/375,606 filed on Sep. 14, 2022, titled "Materials for Metalenses and Through-Waveguide Reflective Metasurface Couplers," which application is hereby incorporated by reference in its entirety.

BACKGROUND

This disclosure relates to metasurfaces. More particularly, this disclosure relates to optical metasurfaces, materials for manufacturing optical metasurfaces, and methods to manufacture materials for optical metasurfaces.

BRIEF DESCRIPTION OF THE DRAWINGS

FIG. 6 illustrates an example display system that utilizes input and output metasurfaces in conjunction with a waveguide, according to one embodiment.

FIG. 7 illustrates an optical system with a metasurface coupler to couple optical radiation into a waveguide, according to one embodiment.

FIG. 11A illustrates graphs of the optical properties of a-Si:H formed using a sputtering deposition process with variations in the flow ratios of argon (Ar) and hydrogen ($H_2$), according to one embodiment.

FIG. 11B illustrates graphs of the optical properties of a-Si:H formed using a sputtering deposition process with variations in the direct current (DC) power levels, according to one embodiment.

FIG. 16 illustrates a table of refractive index values (n) and extinction coefficients (k) for hydrogenated silicon-rich nitride (SRN:H) formed using nitrogen-based PECVD processes with various process parameters, according to one embodiment.

FIG. 18 illustrates a table of refractive index values (n) and extinction coefficients (k) for SRN:H formed using ammonia-based PECVD processes with various process parameters, according to one embodiment.

DETAILED DESCRIPTION

Figure 1:
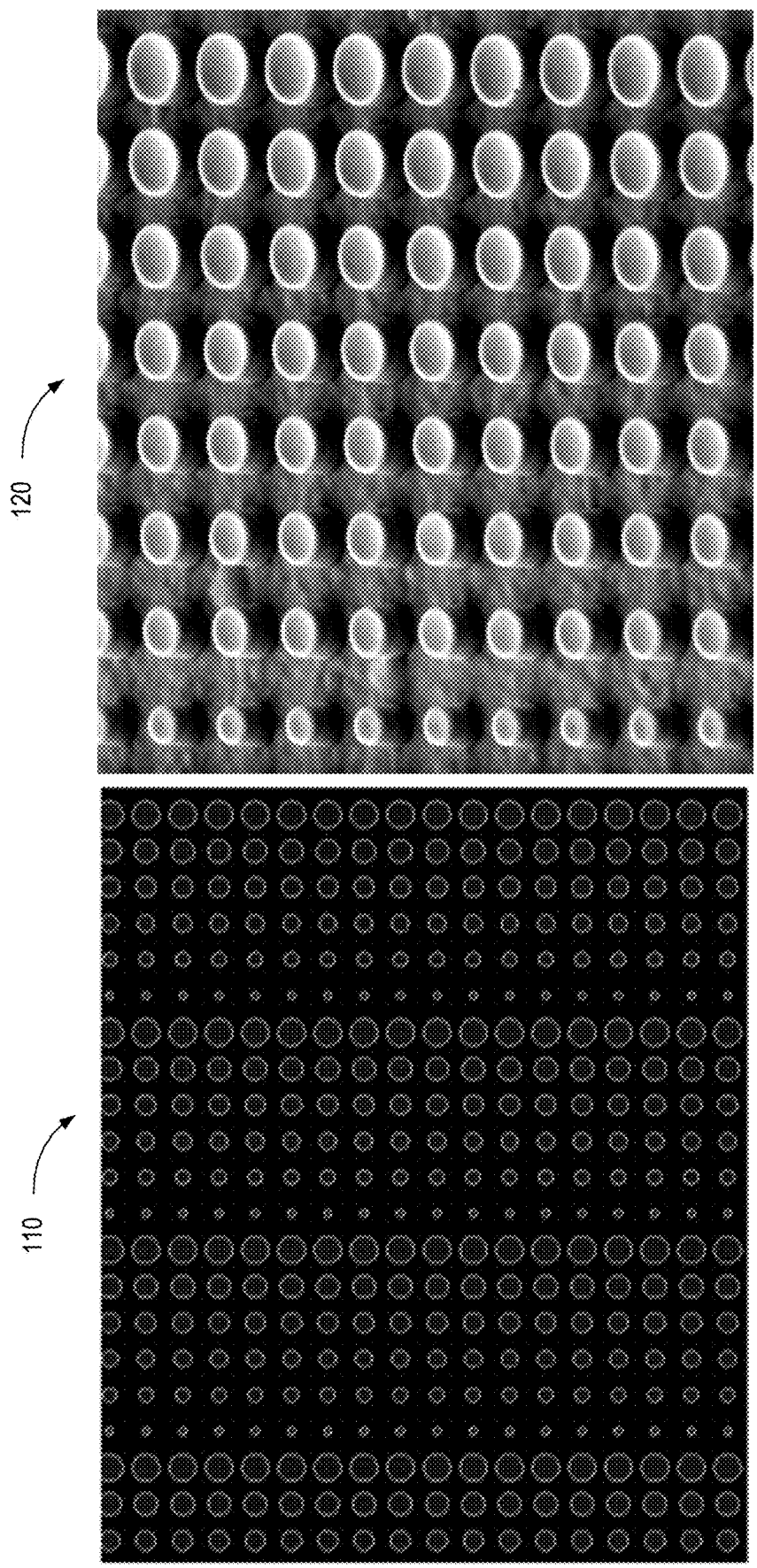
FIG. 1A illustrates a top-down view of an example representation of a pattern of deflector elements (pillars) for a metalens structure, according to one embodiment.
FIG. 1B illustrates an enlarged perspective view of the example representation of the pattern of deflector elements in the metalens of FIG. 1A, according to one embodiment.

According to various embodiments described herein, metasurfaces are used to modify optical radiation. Various types and examples of optical metasurfaces are described herein. However, it is appreciated that the presently described systems and methods are applicable to and can be used with a wide variety of optical metasurfaces and other optical devices. For example, a metasurface may comprise a plurality of slanted gratings or angled ridges with subwavelength interelement spacing. Another type of optical metasurface is a metalens. A metalens may, for example, be used to collect and focus light onto a digital image sensor. Metalenses may be used to, for example, condense, concentrate, and/or collimate optical radiation generated by a light-emitting diode (LED). Metalenses may be used as refractive or diffractive optics to focus light from a large aperture (relative to the sensor size) onto a digital image sensor. A reflective metalens may be used to focus incident light from a large aperture onto a centered or offset digital image sensor. A metalens may be configured to operate as a frequency-selective filter while reflecting, coupling, shaping, or otherwise deflecting optical radiation. A metalens may operate to modify the optical radiation of an LED from a Lambertian emission profile to a condensed, focused, concentrated, or collimated profile.

Narrowband transmissive metalenses may be used to selectively focus a specific frequency of light onto a digital image sensor while allowing other frequencies to pass through the metalens substantially unaltered. A metalens or metamaterial-based lens can be transmissive (analogous to a diffractive lens) or reflective (analogous to a reflective mirror). A metalens can be formed as a three-dimensional metamaterial layer or object of relatively thin (e.g., <1 mm) elements that provide controlled deflection.

Optical metasurfaces may also be used for coupling optical radiation into a waveguide. For example, a metasurface may be patterned as a plurality of rectangular ridges with interelement spacings, heights, and widths selected to couple a wide bandwidth (or narrow bandwidth) of optical radiation into an optical waveguide. For example, a metasurface may be patterned with rectangular ridges to couple red, green, and blue optical radiation into a waveguide as part of an electronic display component.

In some embodiments, efficient wave-front manipulation via a metasurface is accomplished by achieving a 0-2π phase shift within the operational frequency band. In some embodiments, a single resonant mode provides a 0-π phase shift. In such embodiments, a ground plane may be used in combination with deflector elements to provide at least a 0-2π phase shift. In other embodiments, two resonant modes are overlapped with the same magnitude and phase to form, for example, a Huygens metasurface that provides a 0-2π phase shift. In some embodiments, a phase shift range of less than 0-2π may be adequate for some applications.

As described herein, a metasurface deflector element may be formed as a pillar with a cross-sectional area corresponding to a circle, oval, square, rectangle, an n-sided polygon, or another shape, including freeform shapes. In other embodiments, as described herein, the deflector elements of a metasurface may comprise elongated angled ridges forming a slanted grating. For example, a pillar with a cross-section area of a circle may be described as a cylinder having a diameter (D) and height (H).

Optical metasurfaces, including the example metalenses and waveguide coupling metasurfaces described above, may be manufactured using materials that exhibit relatively high indices of refraction (n) and relatively low extinction coefficients (k). For example, annealed polysilicon has been utilized in many embodiments. Annealed polysilicon has an index of refraction between approximately 4.3 and 3.85 for optical wavelengths between 490 nanometers and 650 nanometers, respectively. Annealed polysilicon has extinction coefficients (k) between approximately 0.2 and 0.04 for optical wavelengths between 490 nanometers and 650 nanometers. As understood by those of skill in the art, the optical absorption coefficient of a material is a function of the extinction coefficient (k), such that lower extinction coefficients (k) correspond to higher optical efficiencies (e.g., lower optical absorption and/or higher transparency).

This disclosure describes the use of hydrogenated amorphous silicon (a-Si:H) to form the deflector elements of a metasurface. This disclosure also describes the use of silicon-rich nitride to form the deflector elements of a metasurface. The silicon-rich nitride may alternatively be referred to as silicon-rich silicon nitride, and is abbreviated as (SRN) herein. In contrast to stoichiometric silicon nitride ($Si_3N_4$), the SRN is deposited, as described herein, to have a higher content of silicon such that the SRN comprises non-stoichiometric silicon. In still other embodiments, the SRN may be hydrogenated to form hydrogenated silicon-rich nitride (SRN:H). The SRN and a-Si:H materials described herein both include silicon, and so may be referred to herein as silicon-based materials. This disclosure also contemplates the use of hydrogenated silicon nitride ($SiN_x$:H) for use in forming pillars, angled ridges, deflectors, resonators, and/or other metasurface elements of a metasurface (such as, but not limited to, a metalens or metasurface waveguide coupler). The $SiN_x$:H material has a higher index of refraction (n) than standard SiNx. However, using the deposition techniques and process parameters described herein, the SRN:H materials can have a higher index of refraction (n) and lower extinction coefficient (k) than SiNx. The A-Si:H, SRN:H, and $SiN_x$:H include silicon and are hydrogenated, and so may be referred to herein as hydrogenated silicon-based materials.

It is appreciated that a-Si:H, SRN, SRN:H, and $SiN_x$:H are not interchangeable in all applications. Moreover, the optical properties of each of a-Si:H, SRN, SRN:H, and $SiN_x$:H vary based on the deposition process and the process parameters utilized. While many of the embodiments of specific metasurfaces are described below in the context of using any one of a-Si:H, SRN, SRN:H, and/or $SiN_x$:H, the use of each of the different materials may be selected based on the target optical properties for a specific application, cost considerations, optical requirements, and compatibility of the deposition process and process parameters with other components of an optical device. For example, SRN:H may be deposited to have a lower extinction coefficient (k) than SRN. As This disclosure also describes manufacturing techniques and manufacturing parameters used to control the optical properties of the a-Si:H, SRN, and/or SRN:H. For example, this disclosure provides detailed temperature values, gas flow ratios, radio frequency (RF) power levels, and direct current (DC) power levels that can be used in sputtering processes, low-pressure chemical vapor deposition (LPCVD) processes, and/or plasma enhanced chemical vapor deposition (PECVD) processes to increase the index of refraction (n) and/or reduce the extinction coefficient (k). In many instances, a-Si:H, SRN, and/or SRN:H manufactured using existing approaches may not be suitable or may be sub-optimal for use in optical metasurfaces. However, the presently described manufacturing and deposition techniques and/or specific process parameters may be utilized to manufacture a-Si:H, SRN, and/or SRN:H suitable for use, or even optimized for use, as an optical element in an optical metasurface.

The a-Si:H, SRN, SRN:H, and/or $SiN_x$:H materials described herein may be utilized in place of or in addition to titanium dioxide, polysilicon, annealed polysilicon, silicon nitride, amorphous silicon, and/or other like materials in any of a wide variety of metasurface devices. For example, the materials described herein and the methods of manufacturing the materials described herein may be utilized in conjunction with the devices described in, without limitation, U.S. Pat. No. 11,054,660 titled "Refractive Structures with Direction-Selective Filtering," Issued Jul. 6, 2021; U.S. patent application Ser. No. 17/352,911 titled "Optical Metalenses," filed on Jun. 21, 2021; U.S. patent application Ser. No. 17/682,085 titled "Optical Metalens Systems," filed on Feb. 28, 2022; U.S. patent application Ser. No. 18/170,549 titled "Metasurface Waveguide Couplers," filed on Feb. 17, 2023; and U.S. patent application Ser. No. 18/451,031 titled "Metalens Collimators and Condensers," filed on Aug. 16, 2023, each of which applications is hereby incorporated by reference in its entirety.

Absorptive loss in a material is linearly proportional to the product of the refractive index or index of refraction (n) and the extinction coefficient (k), such that the absorptive loss is a function of n*k. The absorptive loss represents one aspect of optical inefficiency due to light lost or converted to heat. In many embodiments, an ideal material may have zero absorptive loss. A perfectly transparent material has zero absorptive loss.

The optical function of the material or its ability to implement phase-shifting is a function of the index of refraction (n). Many embodiments of metasurfaces utilize a configuration in which elements of the metasurface have a relatively high index of refraction relative to the adjacent media (e.g., air for free space lenses). The difference in the indices of refraction of the metasurface elements and the surrounding material is referred to as the index contrast, where a high index contrast is beneficial in many implementations.

In many embodiments of metasurfaces, a material with a refractive index greater than approximately 2.0 can be considered a "high index" material and may be sufficient for use as a metasurface element (e.g., resonator, pillar, angled ridge, etc.).

Higher index contrast between the metasurface elements and the surrounding material allows for greater design freedom, allowing for meta-atoms with lower aspect ratios. Lower aspect ratios are desirable in many embodiments to facilitate easier fabrication, more design flexibility, a lower profile metasurface, and/or more robust devices. Accordingly, materials that exhibit a high index of refraction (n) (e.g., n≥2.5) and simultaneously exhibit a very low extinction coefficient (k) (k~0) across the entire visible spectrum, or at least for an operational bandwidth, are desirable.

It is advantageous if these materials are complementary metal-oxide semiconductor (CMOS) compatible and do not require a high-temperature annealing step. CMOS-compatible materials that do not require high-temperature annealing can be used to form metasurfaces directly on top of existing optoelectronics devices. A material with a uniform or more uniform index of refraction (n) and extinction coefficient (k) over the operational bandwidth (e.g., visible light spectrum) is preferred over a material with an index of refraction (n) and extinction coefficient (k) that varies over a range of frequencies. Steeply sloping curves in certain frequency regimes make the design of a metasurface more challenging.

Some of the infrastructure that can be used with embodiments disclosed herein is already available, such as general-purpose computers, computer programming tools and techniques, digital storage media, rockets to launch satellites equipped with telescopes and other digital imaging devices, communication links, and the like. A computing device or controller may include a processor, such as a microprocessor, a microcontroller, logic circuitry, or the like.

Standard amorphous silicon is transparent to infrared frequencies but is not transparent in the visible light spectrum, where losses are usually in the range of 20%. Accordingly, standard amorphous silicon is not suitable, or at least not ideal, for use in forming the optical elements of a metasurface designed for use with visible wavelengths of optical radiation. As described herein, a PECVD or sputtering deposition process may be used, with specific process parameters, to form hydrogen-doped amorphous silicon, referred to as "a-Si:H," that is mostly transparent to visible light and has a relatively high index of refraction. In other embodiments, an LPCVD process may be used to form SRN (e.g., a non-stoichiometric silicon nitride).

Amorphous silicon materials have many dangling bonds when they are deposited. The presence of hydrogen in the film operates to passivate the dangling bonds and improve the optical properties of the material for use in visible light metasurfaces. As described herein, the presence of any contamination can adversely affect the optical properties of the amorphous silicon. A lower base pressure, as well as precise temperature control during the deposition process, is used to promote silicon-hydrogen bonding.

According to various embodiments, a method to manufacture a high-index, optically transparent hydrogenated amorphous silicon (a-Si:H) material includes the use of a PECVD process with a radio frequency (RF) power between 30 and 60 Watts, a flow rate of hydrogen ($H_2$) between 75 and 200 standard cubic centimeters per minute (sccm); and a flow rate of silane ($SiH_4$) between 8 and 12 sccm, The PECVD process may be used to generate an a-Si:H material with an index of refraction (n) greater than 3.0 and an extinction coefficient (k) less than 0.1 for optical wavelengths between 485 nanometers and 650 nanometers. The a-Si:H material may be used in various optical metasurfaces, as described herein and in the patents and patent applications incorporated herein by reference.

According to some embodiments, the a-Si:H material may be deposited using a higher RF power in excess of 60 Watts and/or a lower base pressure. A target index of refraction (n) and/or lower extinction coefficient (k) may be attained by depositing A-Si:H using higher RF powers and/or lower base pressures.

According to various embodiments, a method to manufacture a high-index, optically transparent a-Si:H material includes the use of a sputtering deposition process with a sputtering power between 90 and 150 Watts, a flow rate of hydrogen ($H_2$) between 180 and 220 standard cubic centimeters per minute (sccm), and a flow rate of argon (Ar) between 20 and 100 sccm. The sputtering deposition process may be used to generate an a-Si:H material with an index of refraction (n) greater than 2.8 and an extinction coefficient (k) less than 0.4 for optical wavelengths between 485 nanometers and 650 nanometers.

According to various embodiments, a method to manufacture a high-index, optically transparent SRN material using an LPCVD process with a flow rate of dichlorosilane (DCS) between 100 and 120 sccm, a flow rate of ammonia ($NH_3$) between 15 and 25 sccm, and a pressure between 200 and 250 millitorr (mTorr). The LPCVD process may be used to generate an SRN material with an index of refraction (n) greater than 2.3 and an extinction coefficient (k) less than 0.01 for optical wavelengths between 485 nanometers and 650 nanometers.

According to various embodiments, SRN:H material has a relatively high index of refraction (e.g., n>1.8 when deposited using ammonia and n>2.5 when deposited using nitrogen, in some embodiments). Additionally, SRN:H material has an extremely low extinction coefficient (k) in the visible wavelength regime (e.g., optical radiation having a wavelength between approximately 435 nanometers and 750 nanometers). As compared with a-Si:H, SRN:H is more transparent due to its lower extinction coefficient across a wider bandwidth and provides a more stable film. SRN:H has an even lower extinction coefficient (k) than SRN, such the extinction coefficient of SRN:H can be modeled as nearly zero or negligible. The presence of hydrogen eliminates some of the dangling bonds that are inherent in SRN formed according to the various processes described herein. The hydrogen passivates the dangling bonds that would otherwise result in trap states (which operate as absorption centers giving rise to higher extension coefficient (k) values).

According to various embodiments, SRN:H can be deposited using a PECVD process without any ammonia ($NH_3$). In various embodiments, the deposition process may utilize an RF power level between approximately 200 and 300 Watts. Higher power levels may be utilized and may result in even higher indices of refraction. The deposition time may be very short (e.g., a few minutes), with an example of five minutes being used in the various examples described herein. As described herein the SRN:H may be deposited using a flow rate of silane ($SiH_4$) between approximately 40 and 60 sccm (e.g., 50 sccm), a flow rate of hydrogen ($H_2$) between 100 and 200 sccm, a flow rate of nitrogen ($N_2$) between 100 and 500 sccm, and a flow rate of argon (Ar) between 400 and 600 sccm (e.g., 500 sccm). The exact flow rates may vary from those described. In some embodiments, the SRN:H may be deposited with a pressure of approximately 1500 mTorr or less.

In some embodiments, the SRN:H may be deposited using a PECVD process that utilizes ammonia ($NH_3$) instead of (or in addition to) hydrogen ($H_2$) gas. For example, the SRN:H may be deposited using a PECVD process with an RF power level of approximately 200 Watts (or higher), with a flow rate of silane ($SiH_4$) between approximately 25 and 50 sccm (e.g., 35 sccm), a high flow rate of nitrogen ($N_2$) in excess of 500 sccm (e.g., 1000 sccm), and a flow rate of ammonia ($NH_3$) 10 and 40 sccm (e.g., 20 sccm). Again, the SRN:H may be deposited with a pressure less than approximately 1500 mTorr (e.g., 800 mTorr). In some instances, higher pressure values may be utilized to improve the uniformity of the SNR:H film deposition.

While several example processes and process parameters are described herein for forming SRN:H, it is appreciated that a target (e.g., higher) refractive index (n) and/or a lower extinction coefficient (k) may be obtained by increasing the RF power, adjusting the relative and specific ratios of the gases, modifying the temperature of the substrate upon which the material is being deposited, decreasing the working pressure within the deposition chamber, and/or adjusting the base pressure used for the deposition. Notably, a lower base pressure generally results in a higher purity of SRN:H (e.g., due to the decreased oxygen within the chamber). A PECVD chamber may reduce the base pressure within a chamber to 0.000002 Torr. Lower pressures may be preferable but, if not available, nitrogen gas may be used to purge the chamber and process the wafer to reduce oxygen contamination. In some embodiments, the chamber may be cleaned or purged from contaminants by introducing tetrafluoromethane or carbon tetrafluoride ($CF_4$), argon (Ar), nitrogen ($N_2$), and/or nitrous oxide ($N_2O$).

As detailed herein, SRN may be deposited using $NH_3$; however, this may introduce N—H bonds that are detrimental to the formation of SRN:H. Accordingly, $N_2$ may be used instead of $NH_3$ as the precursor of the nitrogen source, with a separate source of $H_2$ introduced during the process. Since high temperatures (e.g., temperatures greater than approximately 350 degrees Celsius) can break Si—H bonds, lower temperatures may be used to promote bonding between Si—H in the thin film.

In some embodiments, the PECVD process for forming a-Si:H and/or SRN:H may include a plasma warm-up phase during which the plasma is warmed up (e.g., for one or more minutes) to ensure a more uniform plasma field, which results in a more uniform film deposition. As it pertains to SRN and/or SRN:H, the presently described systems and methods benefit from the identification during testing that higher silicon content can result in a material with an index of refraction (n) that is greater than 2.0. Higher nitrogen content can decrease the index of refraction (n) to below 2.0 and is therefore less useful for metasurface formation. N—H bonds introduced when forming SRN:H through ammonia-based PECVD processes result in higher K bonds. Accordingly, the nitrogen-based PECVD (ammonia-less) PECVD process may be preferred in embodiments in which higher indices of refraction (n) are desired in a metasurface. Temperatures greater than approximately 300 degrees Celsius reduce the $H_2$ content within the SRN:H, which results in higher coefficient of extinction (k) values. Accordingly, temperatures below 300 degrees Celsius may be utilized to reduce the coefficient of extinction (k) of the SRN:H.

According to various embodiments, a metalens may be manufactured as described in the patents and patent applications incorporated herein by reference, using the a-Si:H, SRN, SRN:H, and/or $SiN_x$:H materials, using, for example, the manufacturing processes described herein. For example, a method to manufacture a metalens may include depositing an a-Si:H layer on a substrate using a sputtering deposition process and/or a PECVD process described herein. The a-Si:H layer may be coated with a photoresist. The photoresist may be developed with a mask pattern corresponding to a target array of pillar diameters of a metalens. The a-Si:H layer may be etched according to the developed photoresist mask pattern to generate a-Si:H pillars extending from the substrate with a target height.

The optical systems described in the patents and patent applications incorporated herein by references may be manufactured using the a-Si:H, SRN, SRN:H, and/or $SiN_x$:H materials described herein. For example, an optical system may include a metasurface, a waveguide, and an optical source. The optical source generates optical radiation incident on a first face of the waveguide at an angle of incidence at which the optical radiation passes through the waveguide and out of a second face of the waveguide that is opposite the first face of the waveguide. The metasurface may be positioned on the second face of the waveguide to receive the optical radiation that passes through the waveguide from the optical source. The metasurface is operable to reflect the optical radiation back into the waveguide at an angle greater than a critical angle for total internal reflection within the waveguide, such that the optical radiation is conveyed along the length of the waveguide. The metasurface comprises a one-dimensional array of a-Si:H ridges that extend along a dimension perpendicular to the length of the waveguide.

The optical system or metasurface coupler described above, and as described in greater detail in the patents and patent applications incorporated herein by reference, may be manufactured using the a-Si:H, SRN, SRN:H, and/or $SiN_x$:H materials described herein. The a-Si:H, SRN, SRN:H, and/or $SiN_x$:H materials may be used to manufacture a metasurface coupler using any of the sputtering deposition, PECVD, and/or LPCVD processes described herein in connection with the manufacturing methods described in the patents and patent applications incorporated herein by reference. For example, a metasurface coupler may be manufactured by depositing a hydrogenated amorphous silicon (a-Si:H) layer on a planar face of a waveguide substrate. A conductive layer may be deposited on the a-Si:H layer and coated with a photoresist. The photoresist may be processed to define a plurality of elongated rectangular cuboids of photoresist that extend orthogonally with respect to the planar face of the waveguide substrate. An etching process may be used to remove the conductive layer between the elongated rectangular cuboids of photoresist.

The a-Si:H layer may be partially etched between the elongated rectangular cuboids of photoresist to a target depth. The photoresist may be removed to expose a plurality of elongated rectangular ridges of a-Si:H extending from an initial base layer of a-Si:H having an initial thickness. The a-Si:H layer may be ion-beam etched at an angle relative to the planar face of the waveguide substrate for additive formation of a slanted grating of elongated angled ridges of a-Si:H. A metallic reflective layer may be deposited over the slanted grating of elongated angled ridges of a-Si:H.

A processor or controller may include one or more special-purpose processing devices, such as application-specific integrated circuits (ASICs), a programmable array logic (PAL), a programmable logic array (PLA), a programmable logic device (PLD), a field-programmable gate array (FPGA), or another customizable and/or programmable device. The computing device may also include a machine-readable storage device, such as non-volatile memory, static RAM, dynamic RAM, ROM, CD-ROM, disk, tape, magnetic, optical, flash memory, or another machine-readable storage medium. Various aspects of certain embodiments may be implemented using hardware, software, firmware, or a combination thereof.

The components of the disclosed embodiments, as generally described and illustrated in the figures herein, could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail to avoid obscuring aspects of this disclosure. The embodiments of the systems and methods provided within this disclosure are not intended to limit the scope of the disclosure but are merely representative of possible embodiments. In addition, the steps of a method do not necessarily need to be executed in any specific order or even sequentially, nor do the steps need to be executed only once.

FIG. 1A illustrates a top-down view of an example representation of a pattern of deflector elements 110 for a metalens structure, according to one embodiment. As illustrated, a uniform square grid of deflector elements 110 may pattern the deflector elements 110 with uniform spacings between adjacent or nearest neighbor deflector elements with up to approximately a 100% fill factor. Moreover, the deflector elements 110 may be configured with uniform heights. In the illustrated example, the deflector elements 110 comprise circular pillars arranged in a repeating pattern of pillar diameters.

FIG. 1B illustrates an enlarged perspective view of the example representation of the pattern of deflector elements in the metalens of FIG. 1A, according to one embodiment. As illustrated, an array of deflector elements 120 includes a uniformly spaced arrangement of circular pillars extending from a substrate. The deflector elements 120 have different pillar diameters that increase along one dimension (left to right) and are constant along the other dimension (top to bottom). Alternative patterns of pillar diameters may be used to achieve target deflection patterns.

Figure 2:
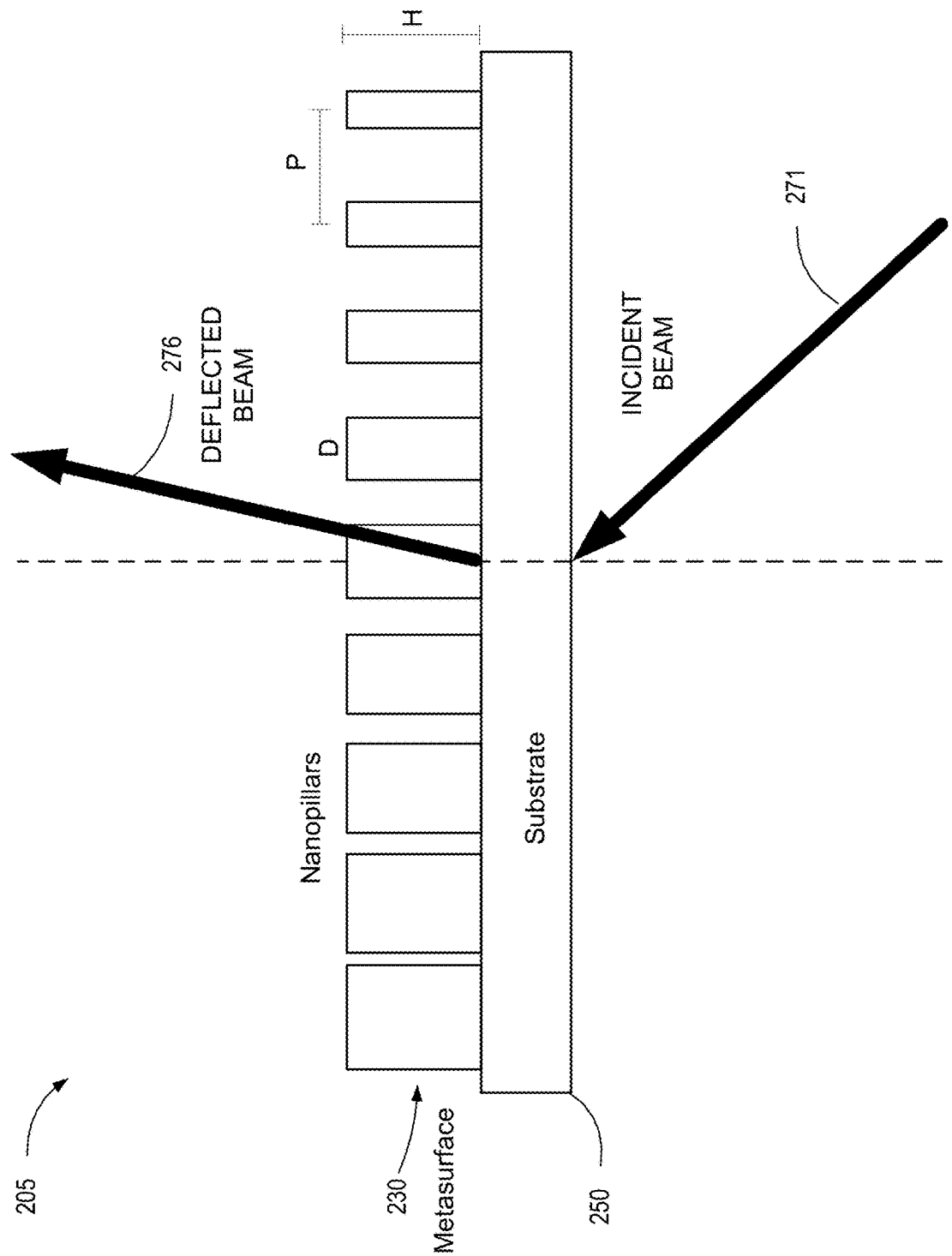
FIG. 2 illustrates an example block diagram of a side view of a metalens with nanopillar deflectors positioned on a substrate to transmissively steer incident optical radiation, according to one embodiment.

FIG. 2 illustrates an example block diagram of a side view of a metalens 205 with nanopillar deflector elements 230 positioned on a substrate 250, according to one embodiment. The metalens 205 transmissively steers or otherwise phase-modulates incident optical radiation 271 as deflected optical radiation 276 at a target deflection angle, beamform, or phase-modulated transmission profile. As illustrated, the nanopillar deflector elements 230 may have a uniform height, H, and varying diameters, D. In the illustrated example, the nanopillar deflector elements 230 are evenly spaced with a nearest neighbor on-center spacing distance, P.

The spacing between the centers of adjacent or nearest neighbor nanopillar deflector elements 230 may be constant despite the varying diameters of the pillars. As described herein, the dimensions, pattern, and spacings of the nanopillar deflector elements 230 are selected to achieve a target deflection pattern (e.g., angle of deflection, dispersion, collimation, convergence, and/or a combination thereof) and frequency response (e.g., target operational bandwidth of optical radiation). The interelement spacing may be on a square grid or another repeating geometric grid, such as a hexagonal grid or a radially symmetric pattern of concentric circles.

Figure 3A:
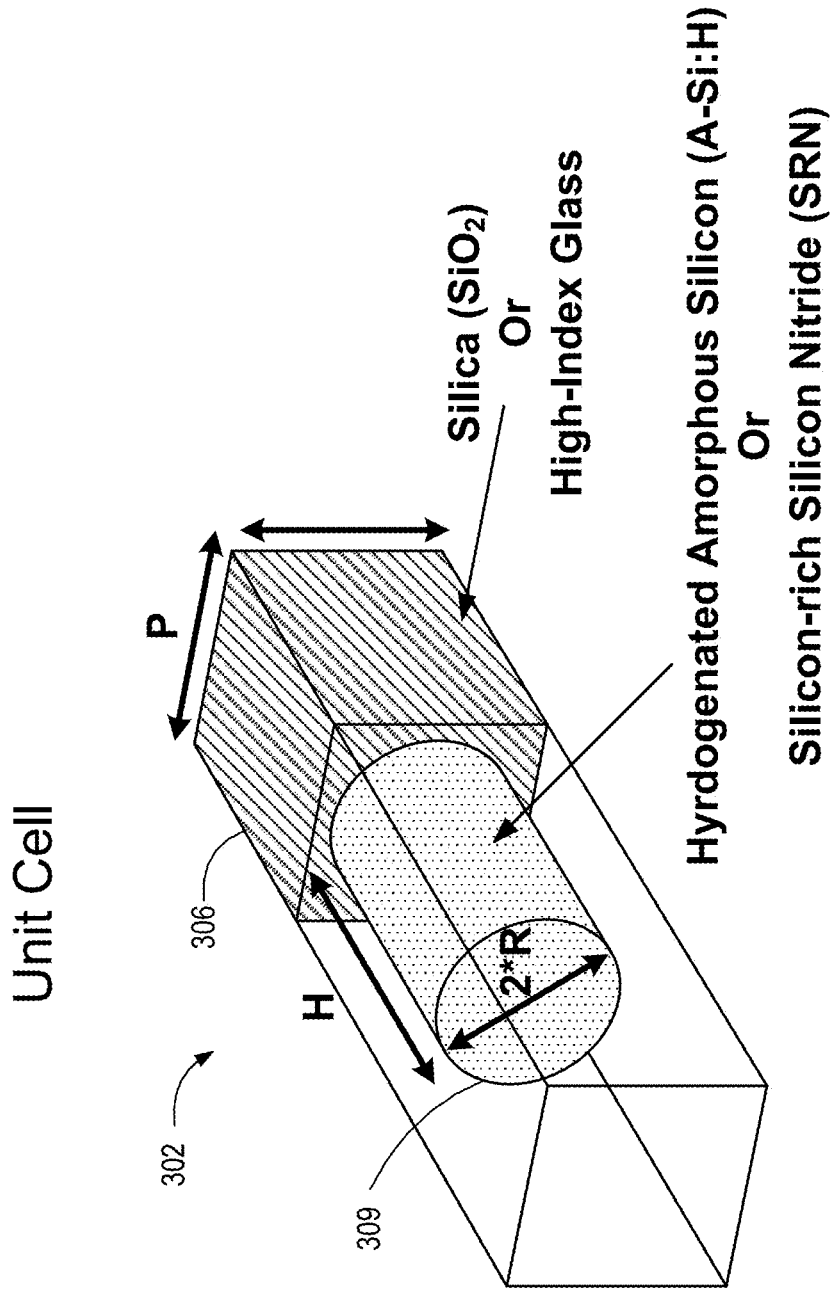
FIG. 3A illustrates an example of a unit cell of a transmissive metasurface, according to one embodiment.

FIG. 3A illustrates an example of a unit cell 302 of a transmissive metasurface with an a-Si:H, SRN, SRN:H, and/or $SiN_x$:H optically resonant pillar 309 extending from a substrate 306, according to one embodiment. The a a-Si:H, SRN, SRN:H, and/or $SiN_x$:H pillar 309 extends from a silicon dioxide ($SiO_2$) substrate or glass substrate 306 having a relatively high index of refraction (e.g., n>2.0). The example unit cell 302 is square with a width of approximately 100-400 nanometers that corresponds to the on-center interelement spacing of an array of unit cells forming a metalens or other metasurface. The pillar, nanopillar, or cylindrical deflector element of a-Si:H (or SRN or SRN:H) 309 extends from the substrate 306 with a height of between 200 and 600 nanometers, depending on the operational wavelength of the optical radiation to be phase-modulated or otherwise deflected.

As described in the various patents and patent applications incorporated herein by reference, a metalens or other metasurface may be manufactured using a two-dimensional array of unit cells 302 with pillars 309 that have diameters ranging from approximately 50 nanometers to 280 nanometers (radii ranging from 25 nanometers to 140 nanometers) to attain phase shifts equal to or exceeding a $2\pi$ range (e.g., 0 to $2\pi$ or $-\pi$ to $\pi$), depending on the operational bandwidth. In some embodiments, a metasurface with pillars or other unit cells capable of less than a phase shift range of 0-$2\pi$ may be adequate for an intended purpose.

Figure 3B:
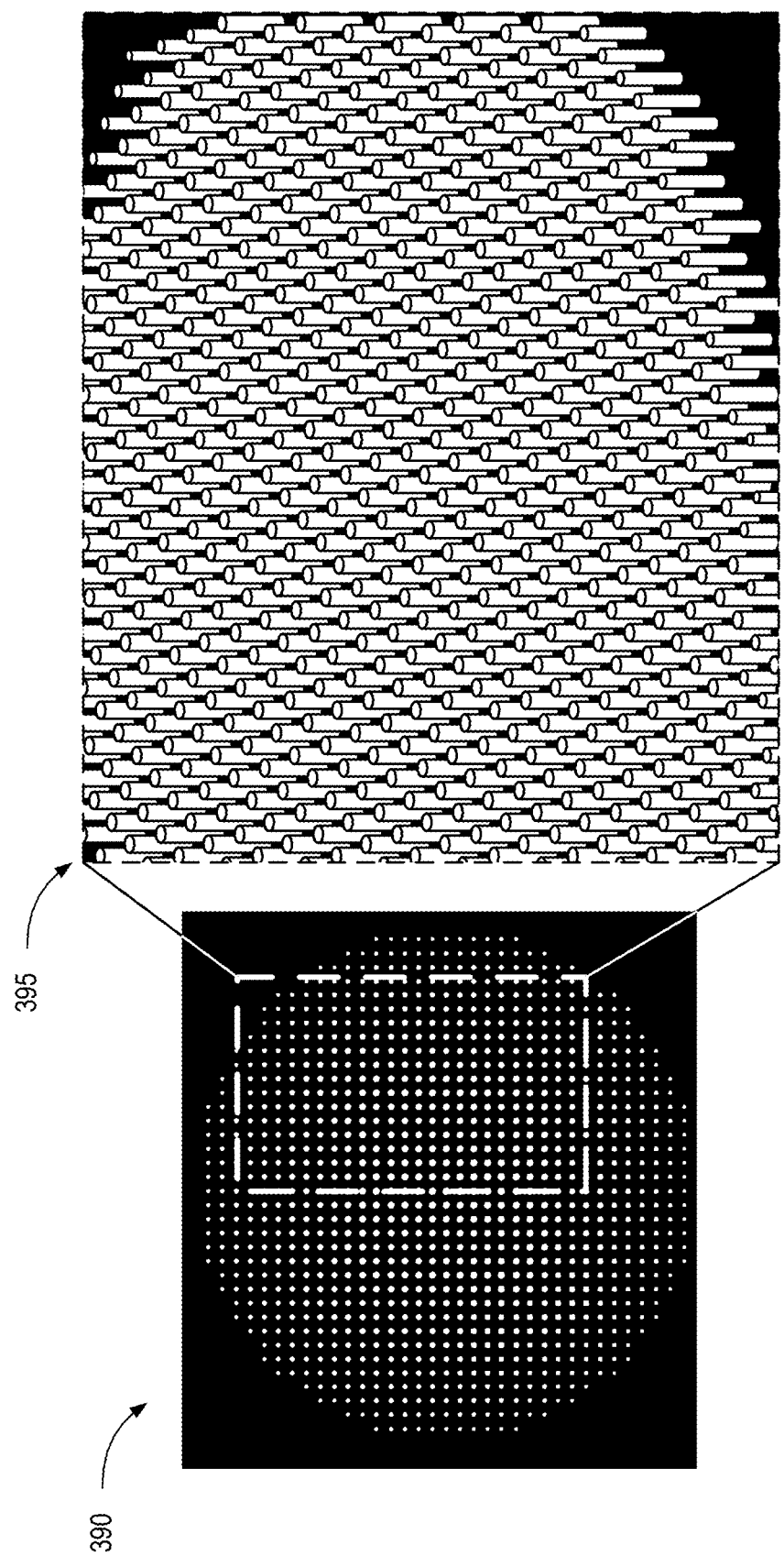
FIG. 3B illustrates a metalens with a radially symmetric pattern of pillar diameters to focus optical radiation, according to one embodiment.

FIG. 3B illustrates a metalens 390 with a radially symmetric pattern of pillar diameters to focus or otherwise phase-modulate optical radiation, according to one embodiment. The pattern of diameters to attain a target deflection pattern or spatial light modulation can be calculated based on the subwavelength amplitude and phase response of each subwavelength pillar. In some instances, numerical simulations may be used to determine the pattern of diameters for a particular deflection pattern (e.g., to focus the optical radiation with an effective focal length). The metalens 390 may be circular, oval, irregularly shaped, or an n-sided polygon, such as a square or rectangle. Expanded window 395 shows an enlarged perspective view of the passive pillars forming the deflector elements of the metalens. Due to the limitations of the drawing, the different diameters of the pillars are not illustrated in the expanded window 395.

The illustrated example is not drawn to scale. For example, a metalens measuring four millimeters (4 mm) on each side would include millions or even hundreds of millions of pillars with varying diameters at uniform interelement spacings. Rather, the illustrated example is intended to facilitate the visualization of a possible pattern of radially symmetrical and radially repeating pillar diameters. The exact pillar diameters and relative sizes may vary and are based on the results of phase gradient calculations or simulation results. The pillars of the metalens 390 may be formed from the a-Si:H, SRN, SRN:H, and/or $SiN_x$:H materials described herein. For example, one or more of the sputtering, LPCVD, and PECVD processes described herein may be utilized to manufacture the pillars of the metalens 390 to have a high index of refraction (n) and/or low extinction coefficient (k).

Figure 4A:
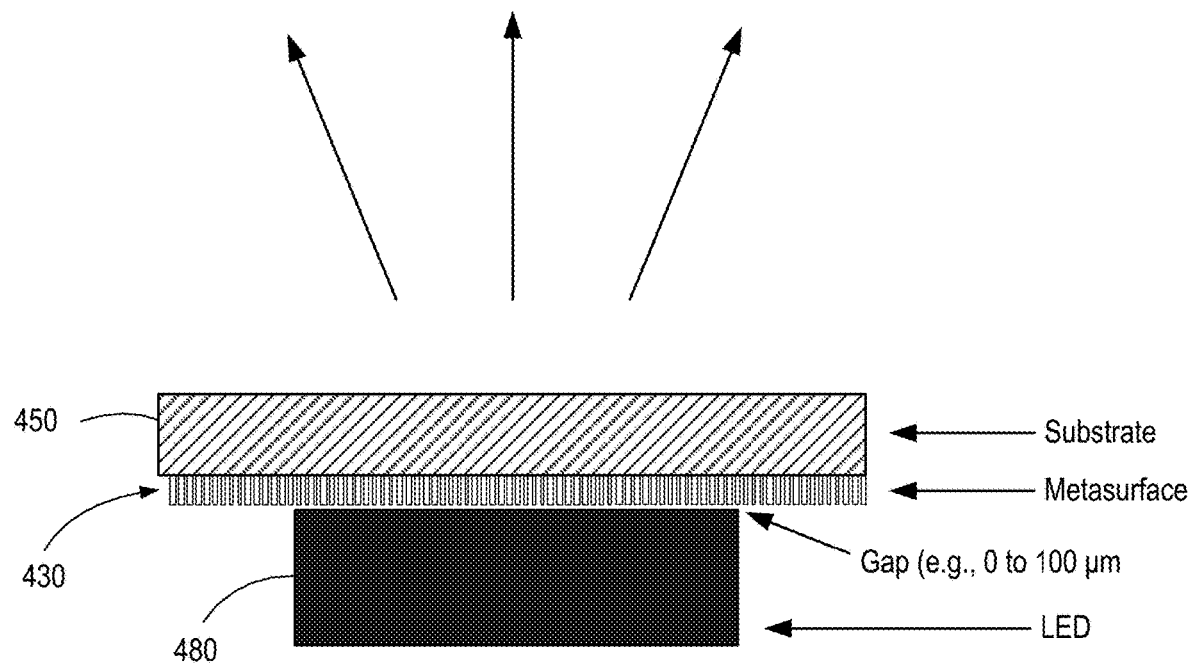
FIG. 4A illustrates a block diagram of an LED with an inverted metalens applied to an LED surface, according to one embodiment.

FIG. 4A illustrates a block diagram of an LED 480 with an inverted metalens with the metasurface of passive pillars 430 applied to an LED surface, according to one embodiment. The optical radiation from the LED 480 is emitted with a divergent emission profile directly into the passive pillars 430. In some embodiments, there is no gap between the passive pillars 430 and the planar surface of the LED 480. In other embodiments, a gap between 0 and 50 micrometers (0.05 millimeters) may be used to prevent damage to the passive pillars 430 during positioning.

In some embodiments, the passive pillars 430 are encapsulated in a transparent medium, such as an optical adhesive, to bond the metasurface elements (the passive pillars 430) to the LED 480. In some embodiments, the passive pillars 430 may be manufactured directly on the top layer of the LED 480. In some of the embodiments in which the passive pillars 430 are manufactured directly on the top layer of the LED 480, the top layer of the LED 480 serves as the "substrate" for the metalens, and the substrate 450 may be omitted. The passive pillars 430 may be formed from the a-Si:H described herein. The a-Si:H passive pillars 430 may be manufactured to have a high index of refraction (n) and/or low extinction coefficient (k) using the sputtering or PECVD processes described herein. Alternatively, the passive pillars 430 may be formed from the SRN described herein, formed using the LPCVD processes described herein. In still other embodiments, the passive pillars 430 may be formed from the SRN:H described herein. In still other embodiments, the passive pillars 430 may be formed from $SiN_x$:H.

Figure 4C:
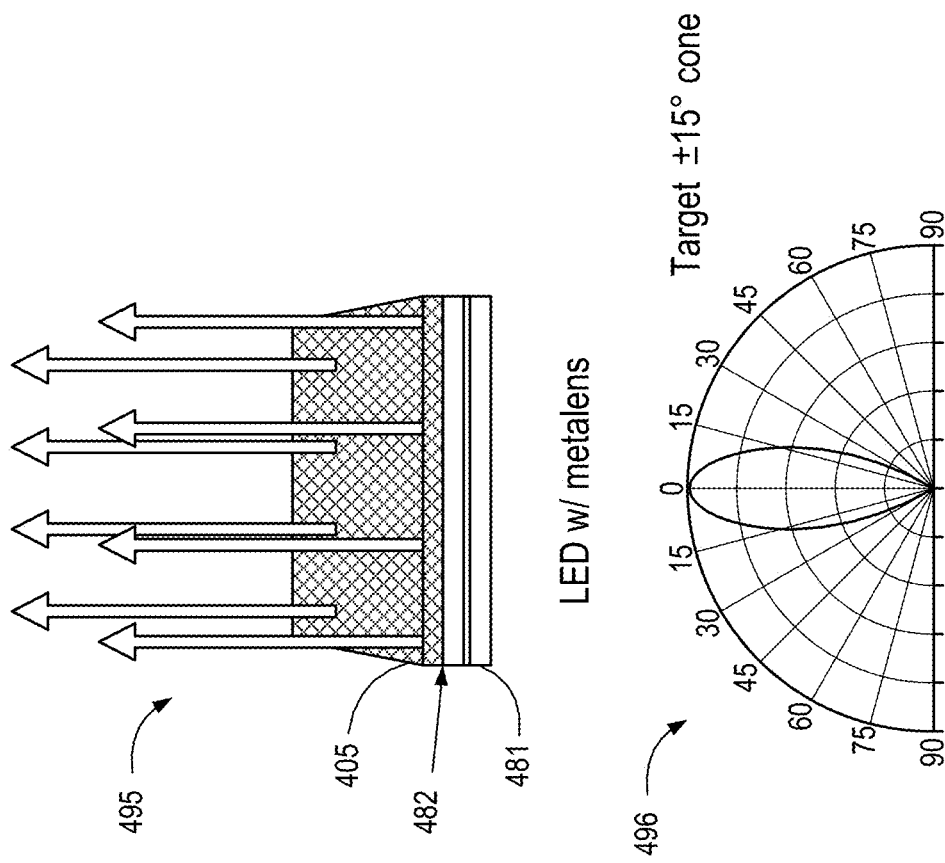
FIG. 4C illustrates a block diagram of an LED with a metalens configured to collimate and/or condense the optical radiation from the LED into a target emission profile, according to one embodiment.
Figure 4B:
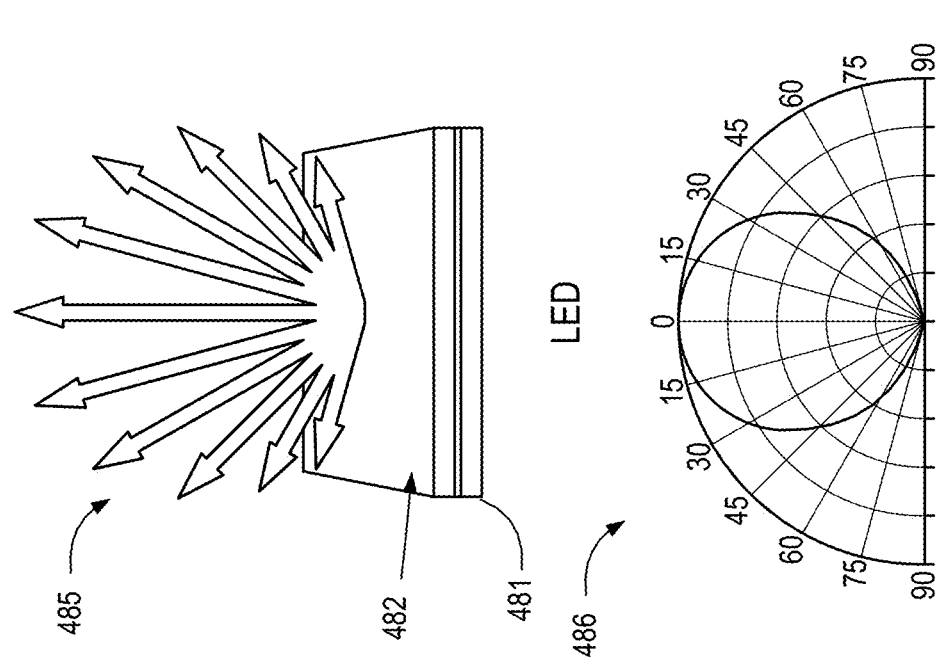
FIG. 4B illustrates a block diagram of an LED with a Lambertian emission profile, according to one embodiment.

FIG. 4B illustrates a block diagram of an LED 481 with planar face 482 from which optical radiation 485 is emitted with a Lambertian emission profile, as exemplified by graph 486.

FIG. 4C illustrates a block diagram of the LED 481 with a metalens 405 positioned in planar alignment with planar face 482 of the LED 481. The metalens 405 is configured to collimate and/or condense the optical radiation from the LED 481 into a modified transmission profile 495. The graph 496 illustrates an example modified transmission profile. The metalens 405 may operate to collimate the optical radiation. The metalens may be formed as described in the patents and patent applications incorporated herein by reference using the a-Si:H, SRN, SRN:H, and/or $SiN_x$:H material described herein.

Figure 5:
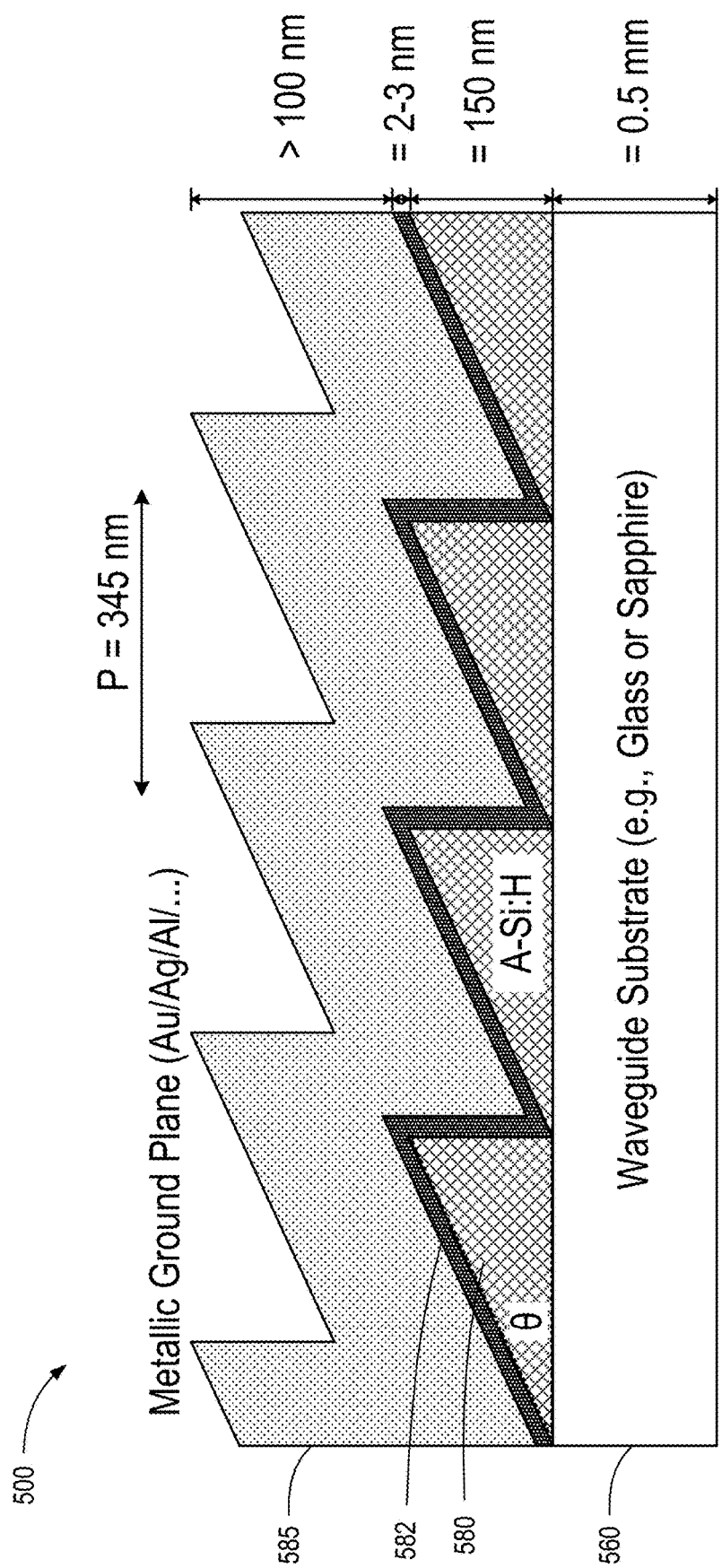
FIG. 5 illustrates an example of an optical system with a slanted grating metasurface coupler with elongated angled ridges of silicon nitride directly on a glass or sapphire waveguide, according to various embodiments.

FIG. 5 illustrates an example of an optical system 500 with a metasurface coupler with a slanted grating formed as an array of elongated angled ridges 580, whose cross-section is a triangle. The elongated angled ridges 580 of silicon nitride are formed directly on a glass or sapphire waveguide substrate 560, according to various embodiments. The illustrated embodiment includes a waveguide substrate 560 with a thickness of approximately 0.5 millimeters. The elongated angled ridges 580 extend along the width of the waveguide substrate 560 (i.e., in and out of the page).

Each elongated angled ridge 580 includes a base face that is co-planar with the surface of the waveguide substrate 560, a height face that extends from the base face to a ridge height with an internal angle greater than 60 degrees relative to the base face (illustrated as a perpendicular 90 degrees), and an angled face that extends between an edge of the base face and the edge of the height face at a target internal angle less than 25 degrees relative to the base face. In the illustrated embodiment, the base face has a width of 345 nanometers, and the height face extends to a ridge height of 150 nanometers. The internal angle between the angled face and the base face is approximately 23.45 degrees. As there is no gap or spacing between adjacent elongated angled ridges 580 in the illustrated embodiment, the pitch of the array of elongated angled ridges 580 forming the slanted grating is equal to the width of the base face of an individual elongated angled ridges 580, which is 345 nanometers in the illustrated embodiment.

The slanted grating of the metasurface coupler includes a reflective metallic ground plane 585 (e.g., a layer or coating), which is adhered to the array of elongated angled ridges 580 via a thin metallic adhesion layer 582. According to various embodiments, the metallic adhesion layer 582 may be a layer of titanium (Ti) or Chromium (Cr) that is 1-5 nanometers thick (illustrated as 2-3 nanometers). The reflective metallic ground plane 585 may have a thickness of approximately 100 nanometers or more and comprise one or more of gold, silver, aluminum, another noble metal, and/or alloys or multilayers thereof. The elongated angled ridges 580 may be formed from the a-Si:H described herein to have a high index of refraction (n) and/or low extinction coefficient (k) using the sputtering or PECVD processes described herein. Alternatively, the elongated angled ridges 580 may be formed from the SRN described herein using, for example, the LPCVD processes described herein. In still other embodiments, the elongated angled ridges 580 may be formed from the SRN:H described herein.

FIG. 6 illustrates an example display system that utilizes an input metasurface coupler 665 and an output metasurface coupler 666 in conjunction with a waveguide 660, according to one embodiment. A display engine 670 generates optical radiation as part of an RGB display (e.g., via an LED array of RGB pixels). The input metasurface coupler 665 couples the generated RGB optical radiation for transmission along the length of the waveguide 660. The output metasurface coupler 666 receives the transmitted optical radiation and decouples the optical radiation from the waveguide 660 for visualization by a user (e.g., via frequency-selective focusing to a target plane) at 675. In the illustrated embodiment, the optical radiation generated by the display engine 670 passes through the input metasurface coupler 665 before entering the waveguide 660. According to various embodiments, the input metasurface coupler 665 may include a two-dimensional array of passive pillars of a-Si:H, SRN, SRN:H, and/or $SiN_x$:H, as described herein, in the context of the descriptions provided in the patents and patent applications incorporated herein by reference and by those of skill in the art.

FIG. 7 illustrates an optical system 700 with a through-waveguide slanted grating metasurface coupler 765 to couple optical radiation into a waveguide 760, according to one embodiment. As illustrated, a display engine 770 transmits optical radiation (e.g., red, green, and blue optical radiation) through the waveguide 760. The optical radiation travels through the waveguide 760 and a substrate 786 of the slanted grating metasurface coupler 765. The optical radiation is deflected by the subwavelength elongated angled ridges 785 of a-Si:H (or SRN or SRN:H) coated with a reflective metallic layer 787.

The optical radiation is reflected by the reflective metallic layer 787 (e.g., silver, gold, aluminum, or a combination thereof) on the subwavelength angled ridges 785 of the slanted grating metasurface coupler 765. The optical radiation is deflected by the subwavelength angled ridges 785 of the slanted grating metasurface coupler 765 before it passes back through the substrate 786 and into the waveguide 760 at an angle for total internal reflection and transmission, at 720, along the length of the waveguide 760 to an output coupler 766. The optical radiation may then be directed into another optical device and/or emitted as free-space optical radiation 775.

Figures 8A, 8B:
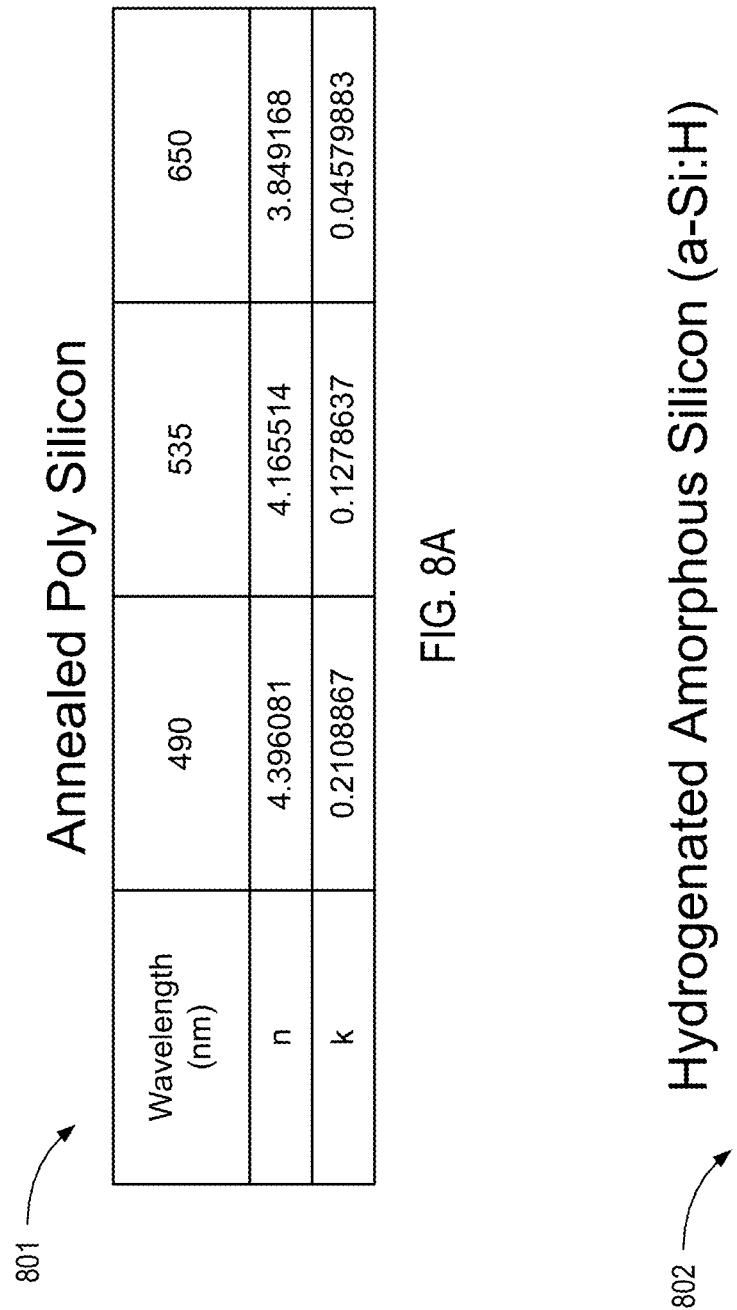
FIG. 8A illustrates a table of the extinction coefficients (k) and the indices of refraction (n) of annealed polysilicon at various wavelengths, according to one embodiment.
FIG. 8B illustrates a table of the extinction coefficients (k) and the indices of refraction (n) of hydrogenated amorphous silicon (a-Si:H) at various wavelengths, according to one embodiment.

FIG. 8A illustrates a table 801 of the extinction coefficients (k) and the indices of refraction (n) of annealed polysilicon at various wavelengths, according to one embodiment.

FIG. 8B illustrates a table 802 of the extinction coefficients (k) and the indices of refraction (n) of hydrogenated amorphous silicon (a-Si:H) at various wavelengths, according to one embodiment. As illustrated, for wavelengths of approximately 650 nanometers, the index of refraction of a-Si:H at 3.3485 is only slightly less than that of polysilicon at 3.849168. However, the extinction coefficient (k) of the a-Si:H is negligible, with a value of 0.0025, while the polysilicon has a non-negligible extinction coefficient (k) of 0.04579883, or 0.03287366 after high-temperature annealing. Accordingly, the a-Si:H provides nearly the same index of refraction with significantly less optical absorption (e.g., lower optical losses, equating to a higher optical efficiency).

For wavelengths of approximately 535 nanometers, the index of refraction of a-Si:H is approximately 3.65, which again is only slightly less than that of polysilicon at 4.165514. However, the extinction coefficient (k) of the a-Si:H is very low, with a value of 0.01, while the polysilicon has a significant extinction coefficient (k) of 0.1278637, or 0.0770857 after high-temperature annealing. Accordingly, the a-Si:H provides nearly the same index of refraction with significantly less optical absorption (e.g., lower optical losses, equating to a higher optical efficiency).

For wavelengths of approximately 490 nanometers, the index of refraction of a-Si:H is approximately 3.784, which again is only slightly less than that of polysilicon at 4.396081. However, the extinction coefficient (k) of the a-Si:H is very low, with a value of 0.082, while the polysilicon has a relatively high extinction coefficient (k) of 0.2108867, or 0.1214736 after high-temperature annealing. Again, the a-Si:H provides nearly the same index of refraction with fewer optical losses.

Figure 9A:
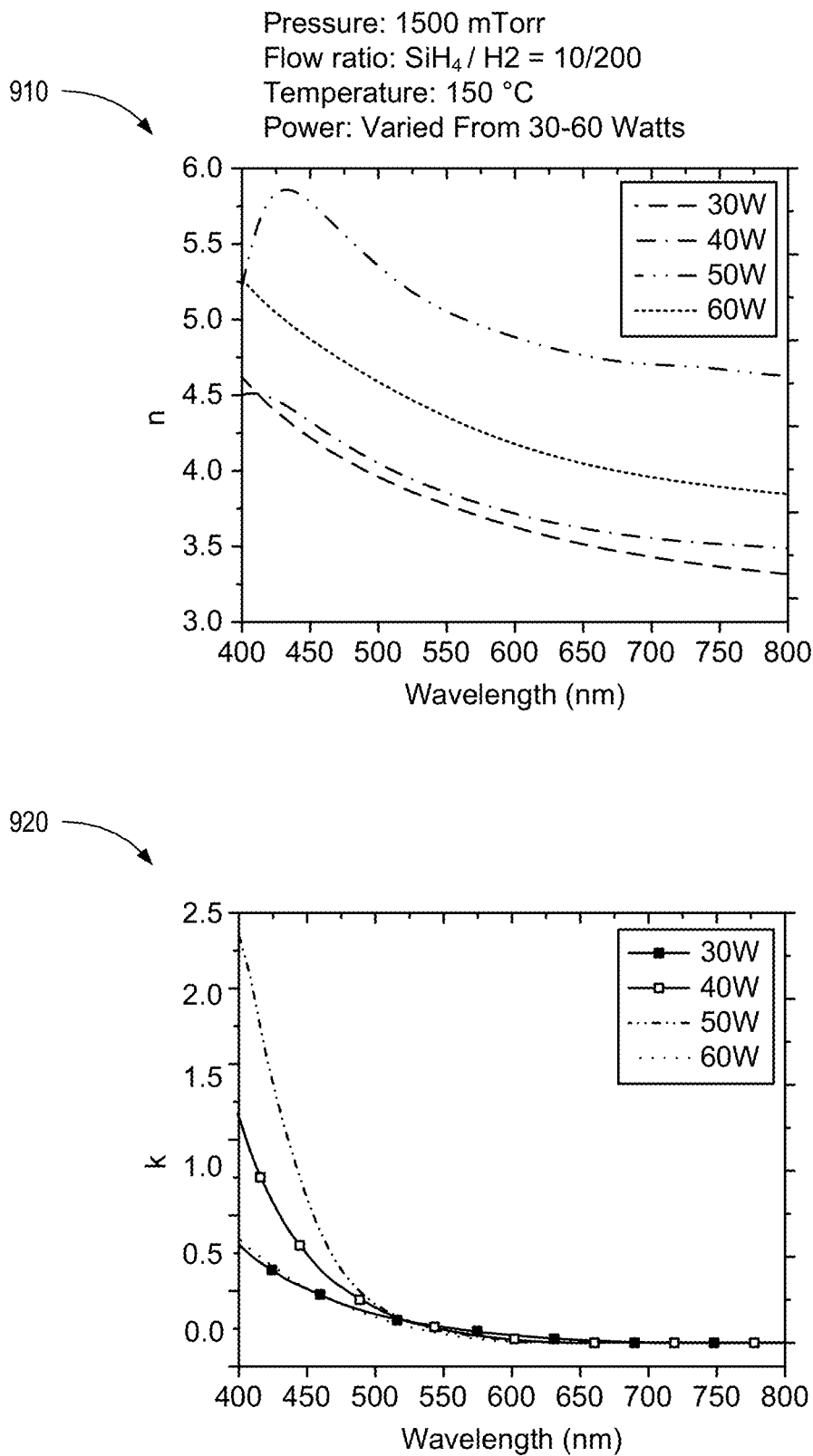
FIG. 9A illustrates graphs of the optical properties of a-Si:H formed using a plasma-enhanced chemical vapor deposition (PECVD) process with variations in the radio frequency (RF) power levels, according to one embodiment.

FIG. 9A illustrates graphs 910 and 920 of various indices of refraction (n) and extinction coefficients (k) of a-Si:H materials formed using a PECVD process with different radio frequency (RF) power levels, according to one embodiment. The graph 910 illustrates the indices of refraction (n) of a-Si:H formed using a PECVD process with a pressure of 1500 mTorr, a flow rate of silane ($SiH_4$) of 10 sccm, a flow rate of Hydrogen ($H_2$) of 200 sccm, and a temperature of 150 degrees Celsius (° C.). The RF power level is varied between 30 Watts and 60 Watts. The graph 920 illustrates the extinction coefficient (k) of a-Si:H formed using the same PECVD process and varying RF power levels. As previously described, the PECVD process may be modified to utilize a pressure less than 1500 mTorr to increase the index of refraction (n) and/or decrease the extinction coefficient (k). Similarly, the PECVD process may be modified to utilize an RF power greater than 60 Watts to increase the index of refraction (n) and/or decrease the extinction coefficient (k).

In various embodiments, the PECVD process may utilize a deposition process with a base pressure less than 1600 mTorr, the deposition duration may range from approximately 40 minutes to 60 minutes, and the deposition temperature may range from approximately 140 to 160 degrees Celsius. The PECVD process may utilize a pressure less than 1500 mTorr to increase the index of refraction (n) and/or decrease the extinction coefficient (k). Similarly, the PECVD process may utilize an RF power greater than 60 Watts to increase the index of refraction (n) and/or decrease the extinction coefficient (k). The duration of the deposition time may be adjusted based on the use of lower pressures and/or higher RF power values.

Figure 9B:
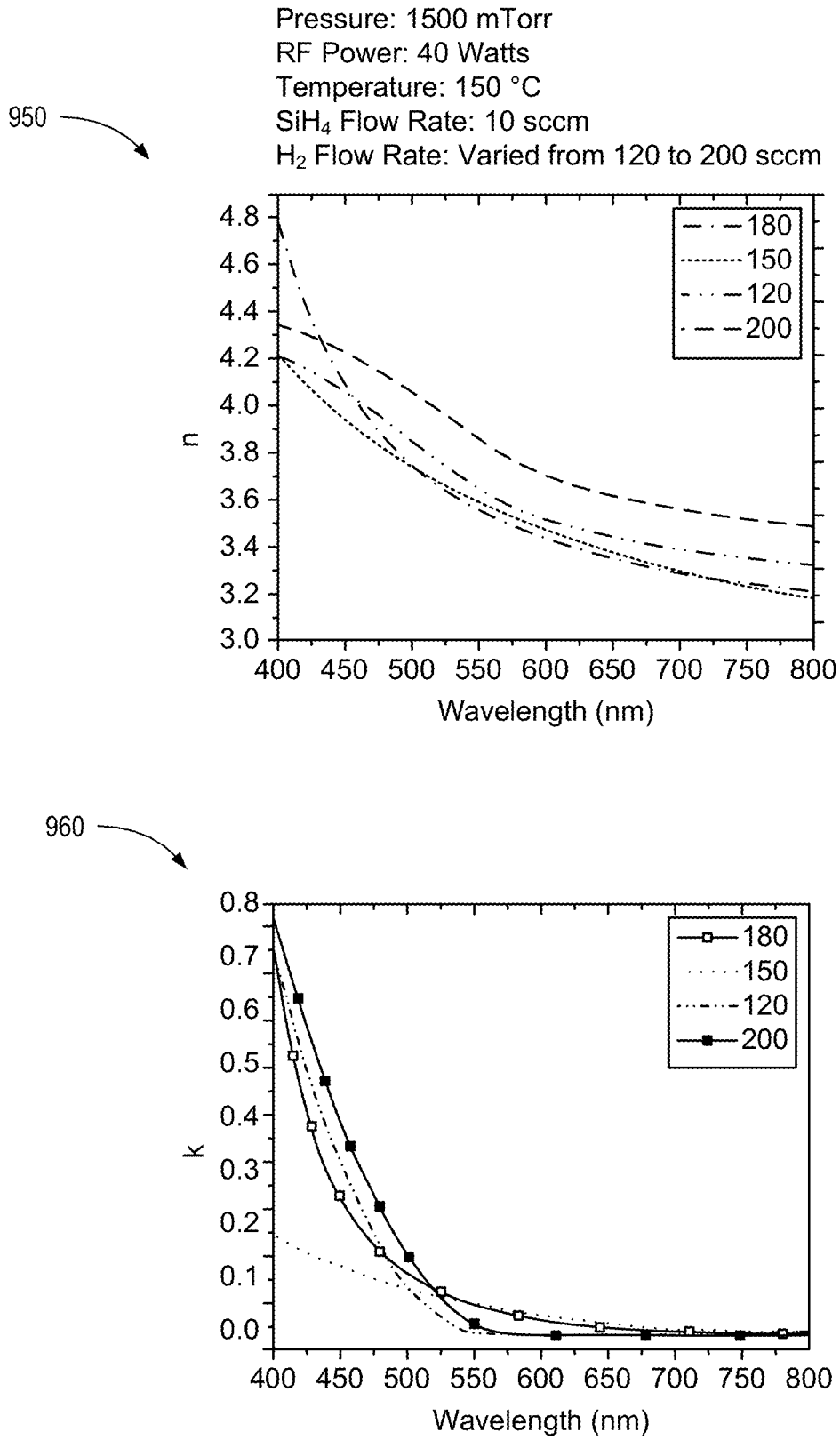
FIG. 9B illustrates graphs of the optical properties of a-Si:H formed using a PECVD process with variations in the flow ratios of silane ($SiH_4$) and Hydrogen ($H_2$), according to one embodiment.

FIG. 9B illustrates graphs 950 and 960 of various indices of refraction (n) and extinction coefficients (k) of a-Si:H materials formed using a PECVD process with different flow ratios of silane ($SiH_4$) and Hydrogen ($H_2$), according to one embodiment. The graph 950 illustrates the indices of refraction (n) of a-Si:H formed using a PECVD process with a pressure of 1500 mTorr, a flow rate of $SiH_4$ of 10 sccm, an RF power level of 40 Watts, and a temperature of 150° C. The flow rate of hydrogen ($H_2$) is varied between 120 sccm and 200 sccm. The graph 960 illustrates the extinction coefficient (k) of a-Si:H formed using the same PECVD process and varying $H_2$ flow rates.

In the context of the graphs 910, 920, 950, and 960, target optical properties of a-Si:H (n and k values) are attained with a low SiH4/H2 ratio and a relatively low RF power, especially for short wavelengths. Higher RF power results in a higher index of refraction (n). Lower $SiH_4$ results in lower extinction coefficients (k), particularly at shorter wavelengths. A low $SiH_4$ to $H_2$ ratio results in the passivation of dangling bonds, which improves the silicon-hydrogen (Si—H) bonding. A low $SiH_4$ to $H_2$ ratio leads to a lower concentration of O—H and suppresses the centers for absorbing light.

Figures 10A, 10B, 10C:
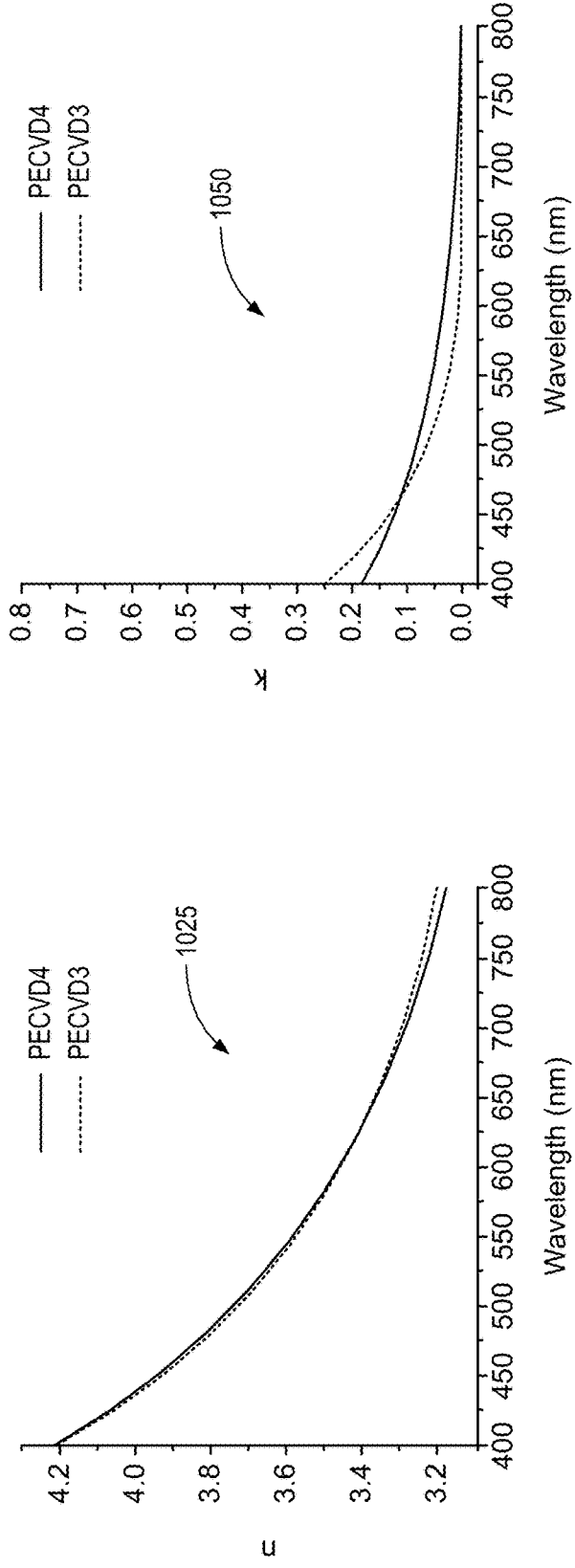
FIG. 10A illustrates a table of refractive index values (n) and extinction coefficients (k) at various optical wavelengths for a-Si:H formed using two example PECVD processes, according to one embodiment.
FIG. 10B illustrates a graph of the refractive index values (n) of the a-Si:H formed using the two example PECVD processes, according to one embodiment.
FIG. 10C illustrates a graph of the extinction coefficients (k) of the a-Si:H formed using the two example PECVD processes, according to one embodiment.

FIG. 10A illustrates a table 1000 of the refractive index values (n) and extinction coefficients (k) at various optical wavelengths for a-Si:H formed using two example PECVD processes, according to one embodiment. As described herein, standard amorphous silicon is highly absorptive at visible wavelengths, reportedly having an extinction coefficient (k) above 0.23 at 630 nanometers that increases nonlinearly to above 1.5 at 450 nanometers. The presently described PECVD processes for forming a-Si:H utilize a controlled ratio of silane ($SiH_4$) and hydrogen ($H_2$) coupled with selected radio frequency (RF) power values and pressure values. The identified PECVD process parameters allow for the formation of a-Si:H with target optical properties (e.g., n>3.0 and k<0.1).

The selected RF power and pressure values influence the optical properties of the material while maintaining the stress low enough to prevent delamination and blistering of the a-Si:H from the substrate. The presently described systems and methods propose a PECVD cluster tool with two PECVD chambers equipped with a load lock. The first chamber, referred to herein as PECVD3, is equipped with a rough pump to reduce the base pressure to 0.002 Torr. The second chamber, referred to herein as PECVD4, is equipped with a rough pump and a turbo pump to reduce the base pressure to less than 0.000002 Torr. In some embodiments, the deposition process for forming the a-Si:H using the PECVD process includes purging the chamber with a non-reactive gas, such as Argon (Ar) or nitrogen (N) prior to starting the deposition process.

The PECVD of a-Si:H is performed at the same temperature, 150° C., and the same pressure and power are the same at 1500 millitorr (mT) and 40 Watts, respectively. Additionally, the flow rate of $SiH_4$ in both example processes is ten (ten) sccm. However, the flow rate of the hydrogen ($H_2$) in the first process (PECVD3) is 90 sccm, while the flow rate of the hydrogen ($H_2$) in the second process (PECVD4) is 150 sccm. The a-Si:H materials formed using the PECVD3 and PECVD4 processes have indices of refraction (n) greater than 3.3 and extinction coefficients (k) less than 0.1 for wavelengths between 650 nanometers and 485 nanometers.

FIG. 10B illustrates a graph 1025 of the refractive index values (n) of the a-Si:H formed using the two example PECVD processes, according to one embodiment.

FIG. 10C illustrates a graph 1050 of the extinction coefficients (k) of the a-Si:H formed using the two example PECVD processes, according to one embodiment.

FIG. 11A illustrates graphs 1110 and 1120 of the optical properties of a-Si:H formed using a sputtering deposition process with variations in the flow ratios of argon (Ar) and hydrogen ($H_2$), according to one embodiment. The optical properties of the a-Si:H formed using a sputtering deposition process are varied based on the ratio of the flow rates of hydrogen ($H_2$) and Argon (Ar), the sputtering power (e.g., DC power), substrate temperature, base pressure, and the distance between the target and substrate.

The graph 1110 illustrates the indices of refraction (n) of a-Si:H formed using a sputtering deposition process with a DC power level of 150 Watts, a working pressure of 4.558 mTorr, and a temperature of 175° C. The ratio of $H_2$/Ar and the specific flow rates of $H_2$ and Ar are varied, as illustrated in the table 1115. The graph 1120 illustrates the extinction coefficient (k) of a-Si:H formed using the same sputtering deposition process and specific flow rates of $H_2$ and Ar. According to various embodiments, the sputtering deposition process may utilize a substrate temperature between approximately 165 and 185 degrees Celsius, and the duration of the sputtering deposition process may be approximately 45 to 65 minutes.

FIG. 11B illustrates graphs 1150 and 1160 of the optical properties of a-Si:H formed using a sputtering deposition process with variations in the direct current (DC) power levels, according to one embodiment. The graph 1150 illustrates the indices of refraction (n) of a-Si:H formed using a sputtering deposition process with a flow rate of $H_2$ of 200 sccm, a flow rate of Ar of 100 sccm, a working pressure of 4.558 mTorr, and a temperature of 175° C. The DC power level is varied between 90 and 150 Watts. The graph 1160 illustrates the extinction coefficient (k) of a-Si:H formed using the same sputtering deposition process and variations in DC power level.

In the context of the graphs 1110, 1120, 1150, and 1160, target optical properties of a-Si:H (n and k values) are attained with a flow ratio of $H_2$/Ar of 200/100, with a flow rate of $H_2$ of 200 sccm and a flow rate of Ar of 100 sccm. While the a-Si:H formed using a flow ratio of 160/20 (sccm/sccm) attained favorable optical properties, the film had a thickness of 140 angstroms (A), which may not be suitably thick in some applications. Higher sputtering power decreases the extinction coefficient (k) without significantly lowering the index of refraction (n). Higher DC power levels may increase the temperature to improve the bonding between hydrogen and silicon ions.

Figure 12:
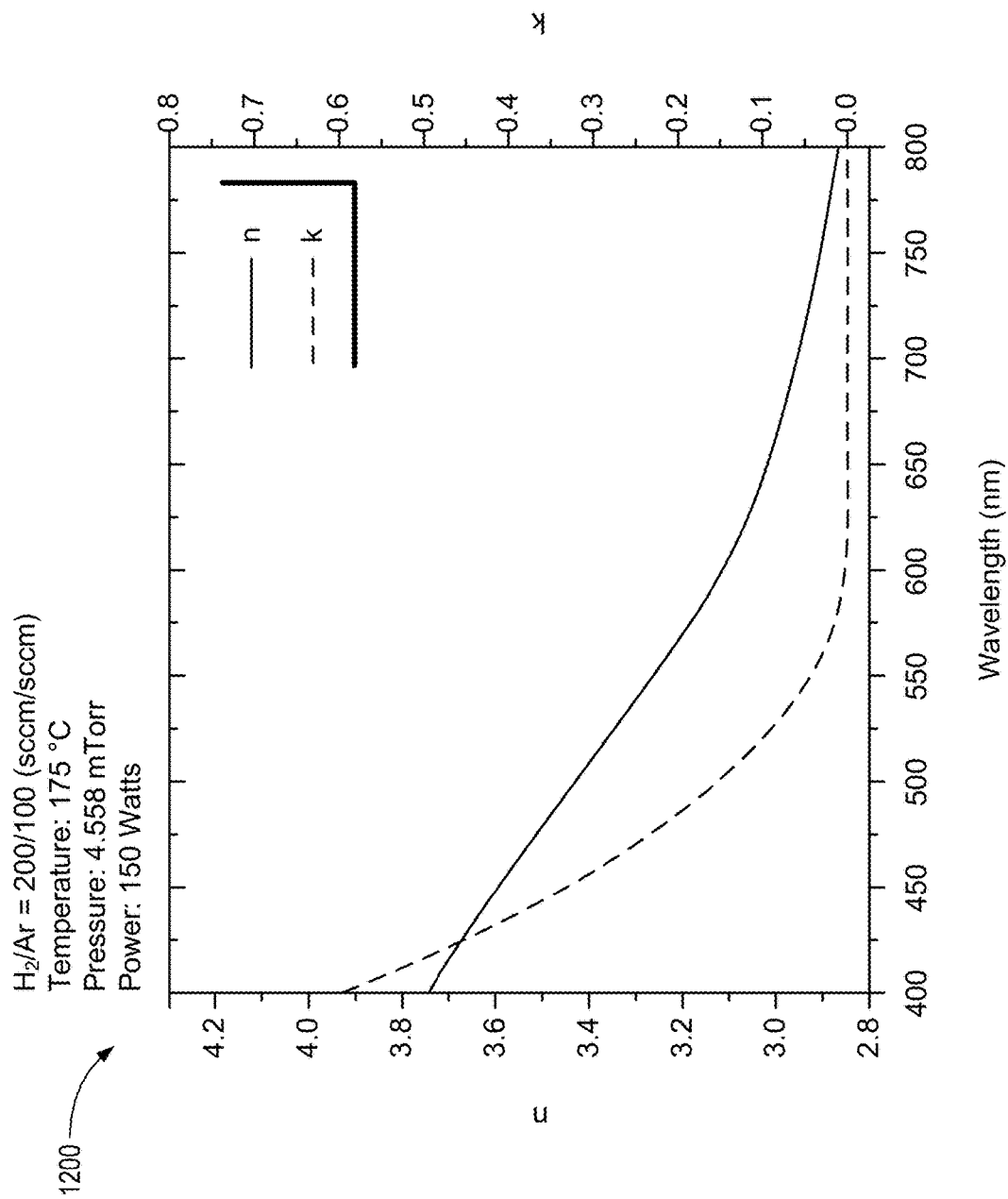
FIG. 12 illustrates a graph of the refractive index values (n) and extinction coefficients (k) for a-Si:H formed using an example sputtering deposition process, according to one embodiment.

FIG. 12 illustrates a graph 1200 of the refractive index values (n) and extinction coefficients (k) for a-Si:H formed using an example sputtering deposition process, according to one embodiment. The graph 1200 illustrates the indices of refraction (n) of a-Si:H formed using a sputtering deposition process with a flow rate of $H_2$ of 200 sccm, a flow rate of Ar of 100 sccm, a temperature of 175° C., a working pressure of 4.558 mTorr, a duration of deposition of 55 minutes, and a power level of 150 Watts. As illustrated, the index of refraction (n) of the a-Si:H formed using the example sputtering deposition process is above 2.8 for the entire visible spectrum. The extinction coefficient (k) is less than 0.3 for wavelengths greater than 450 nanometers.

Figure 13:
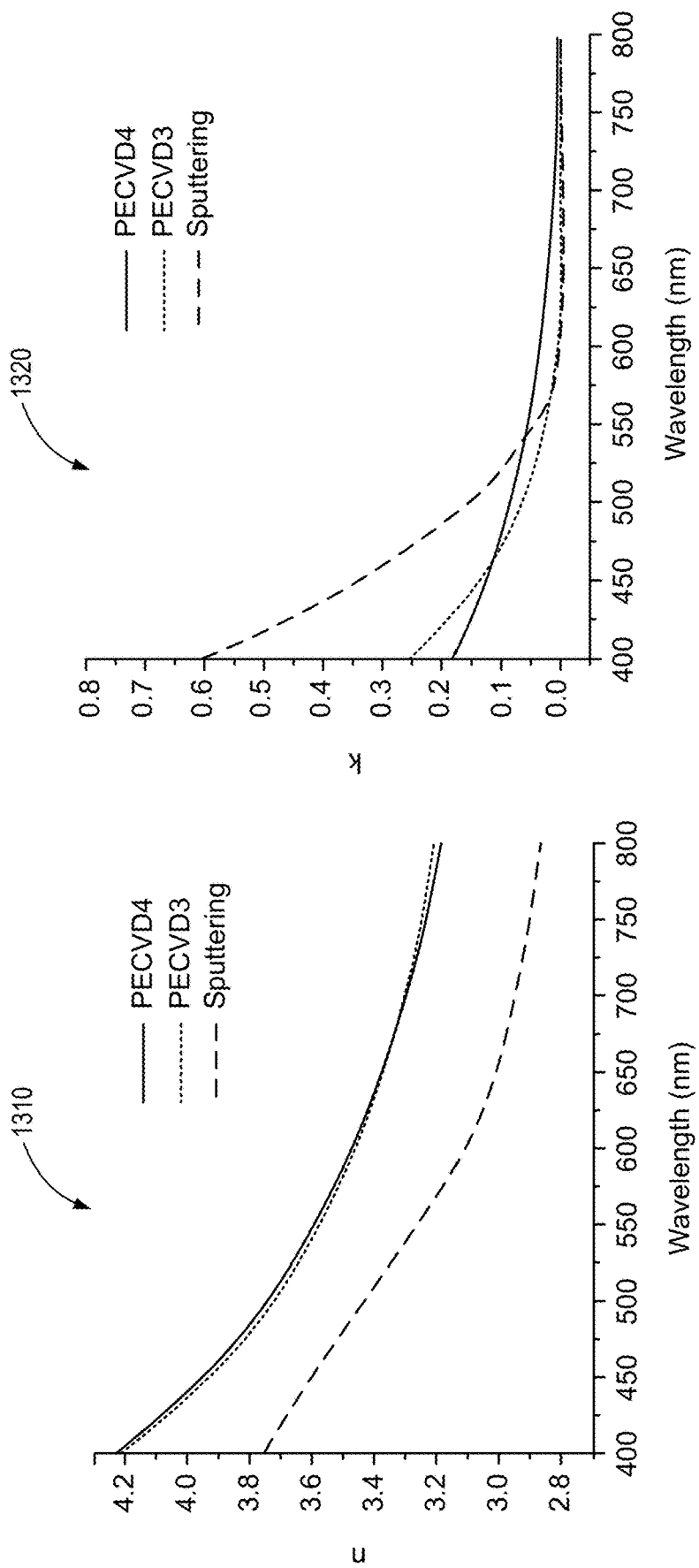
FIG. 13 illustrates graphs of the optical properties of the example PECVD and sputtering deposition processes described in the context of FIGS. 10A-12, according to one embodiment.

FIG. 13 illustrates graphs 1310 and 1320 of the optical properties of the example PECVD process described in the context of FIGS. 10A-10C and the example sputtering deposition process described in the context of FIG. 12, according to one embodiment. The graph 1310 illustrates the refractive index values (n) for a-Si:H formed using the example PECVD and sputtering deposition processes. The graph 1320 illustrates the extinction coefficients (k) for a-Si:H formed using the example PECVD and sputtering deposition processes.

As illustrated, a-Si:H with lower indices of refraction (n) is obtained using the sputtering deposition process described herein. Stated another way, a-Si:H with higher indices of refraction (n) is obtained using the PECVD processes described herein. Additionally, the a-Si:H materials made using the PECVD processes described herein have lower extinction coefficients (k), particularly at lower wavelengths. Accordingly, the PECVD processes, which provide for a better n*k multiplication, can be used to manufacture a-Si:H with desirable optical properties for use in visible light optical metasurfaces.

Figure 14:
FIG. 14 illustrates a table of refractive index values (n) and extinction coefficients (k) at various optical wavelengths for silicon-rich nitride (SRN) formed using low-pressure chemical vapor deposition (LPCVD) processes with various parameters, according to one embodiment.

FIG. 14 illustrates a table 1410 of refractive index values (n) and extinction coefficients (k) at various optical wavelengths for silicon-rich nitride (SRN) formed using an LPCVD process with various parameters, according to one embodiment. SRN has a very low extinction coefficient of zero or nearly zero across the visible spectrum. However, standard SRN has a relatively low index of refraction (n). The presently described systems and methods propose forming a high-index SRN material for use in a visible light optical metasurface using an LPCVD process. The proposed manufacturing process provides for an SRN material with an index of refraction in excess of 2.3 for visible light wavelengths smaller than 750 nanometers. The LPCVD process is tuned to minimize the presence of oxygen bonds within the film to decrease the extinction coefficient (k) to nearly zero.

As illustrated in the table 1410, SRN material may be formed at a temperature of 835° C. with a flow rate of ammonia ($NH_3$) of 20 sccm, while the flow rate of the dichlorosilane (DCS) ranges from 100 to 120 sccm. A manufacturing pressure of 200 or 250 mTorr may be utilized. As illustrated, the various manufacturing processes result in "goodness-of-fits" (GOFs) in excess of 96% being attained. In various embodiments, the LPCVD process may utilize a temperature between approximately 800 and 850-degrees and last for a duration of 70 to 90 minutes.

Figure 15:
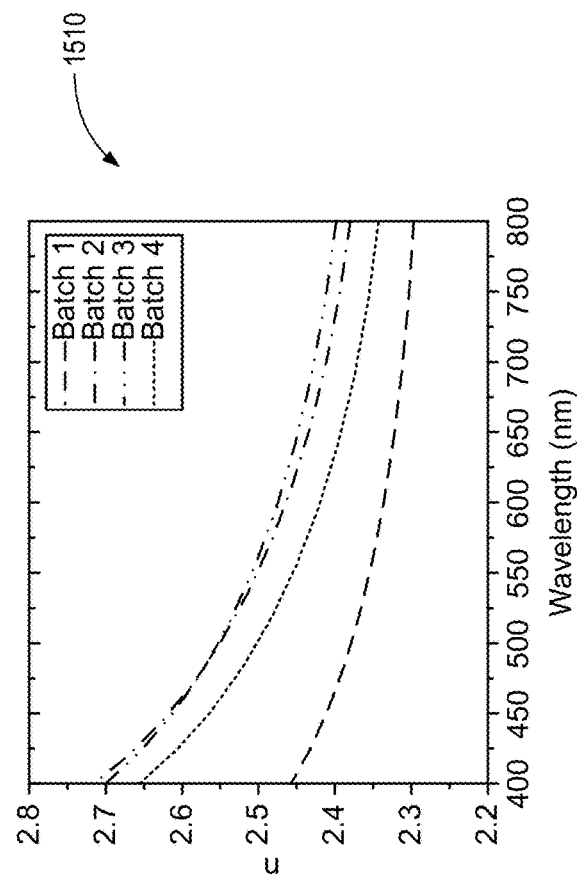
FIG. 15 illustrates a graph of the refractive index values (n) of the SRN formed using various example LPCVD processes, according to one embodiment.

FIG. 15 illustrates a graph 1510 of the refractive index values (n) of the SRN formed using various example LPCVD processes, according to one embodiment. The extinction coefficients (k) are not graphed since the values are essentially zero across the visible spectrum.

FIG. 16 illustrates a table 1610 of refractive index values (n) and extinction coefficients (k) for hydrogenated silicon-rich nitride (SRN:H) formed using nitrogen-based PECVD processes with various process parameters, according to one embodiment. In the illustrated example PECVD processes of the table 1610, ammonia ($NH_3$) is not used. Instead, nitrogen ($N_2$) and hydrogen ($H_2$) are utilized. In each instance, the extinction coefficient of the SRN:H material can be modeled as nearly zero or negligible. The index of refraction at 650 nanometers ranges from 1.6492 to 2.5811.

In examples illustrated in table 1610, the SRN:H is deposited for 5 minutes using an RF power level between 200 and 300 Watts at a pressure of less than 1500 mTorr. The SRN:H is deposited using a flow rate of silane ($SiH_4$) of 50 sccm, a flow rate of hydrogen ($H_2$) between 100 and 200 sccm, a flow rate of nitrogen ($N_2$) between 150 and 450 sccm, and a flow rate of argon (Ar) of 500 sccm. The exact flow rates may vary from those described.

Figure 17:
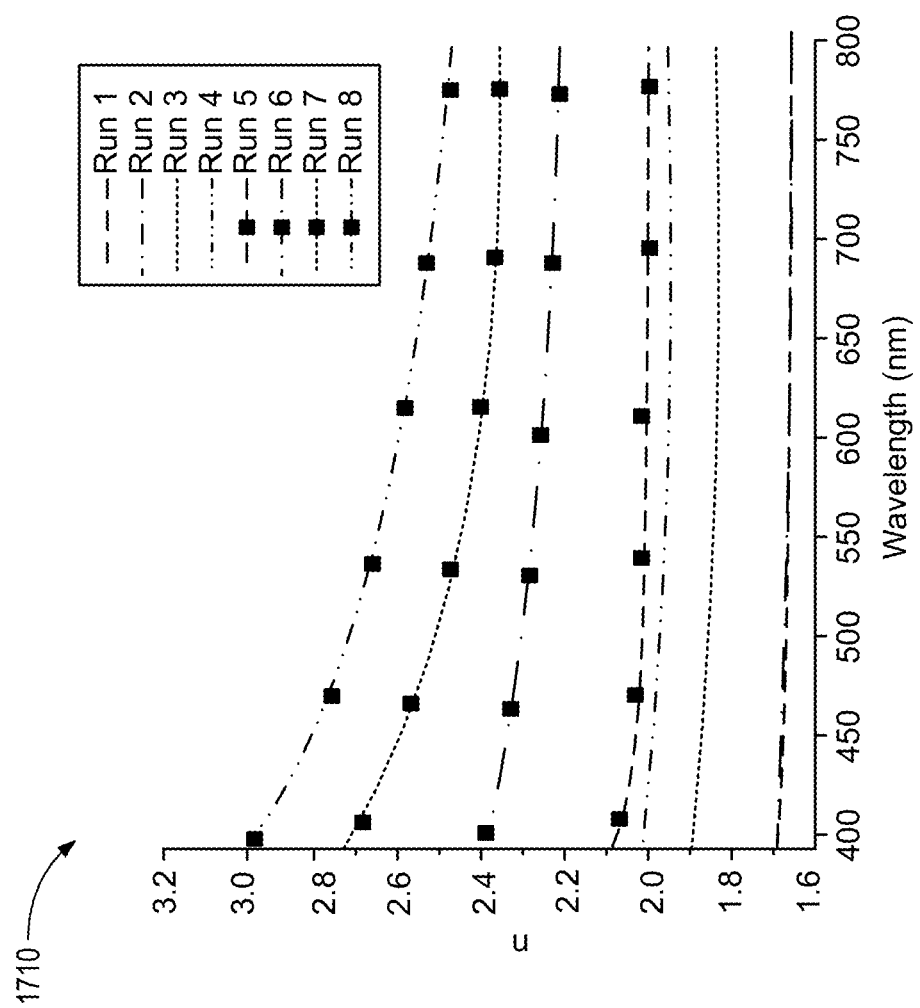
FIG. 17 illustrates a graph of the refractive index values (n) of the SRN:H formed using various example nitrogen-based PECVD processes, according to one embodiment.

FIG. 17 illustrates a graph 1710 of the refractive index values (n) of the SRN:H formed using various example nitrogen-based PECVD processes (e.g., without ammonia ($NH_3$)), according to one embodiment. The extinction coefficients (k) are not graphed since the values are essentially zero across the visible spectrum.

FIG. 18 illustrates a table 1810 of refractive index values (n) and extinction coefficients (k) for hydrogenated silicon-rich nitride (SRN:H) formed using ammonia-based PECVD processes with various process parameters, according to one embodiment. As described herein, SRN:H may be deposited using a PECVD process that utilizes ammonia ($NH_3$) instead of hydrogen ($H_2$) gas. In the illustrated example, the SRN:H is deposited for 5 minutes using a PECVD process with an RF power level of approximately 200 Watts, a flow rate of silane ($SiH_4$) of 35 sccm, and a flow rate of nitrogen ($N_2$) of 1000 sccm. A flow rate of ammonia ($NH_3$) of 21 sccm or 14 sccm is used in the examples. A pressure of 800 mTorr is used in the example processes.

Figure 19:
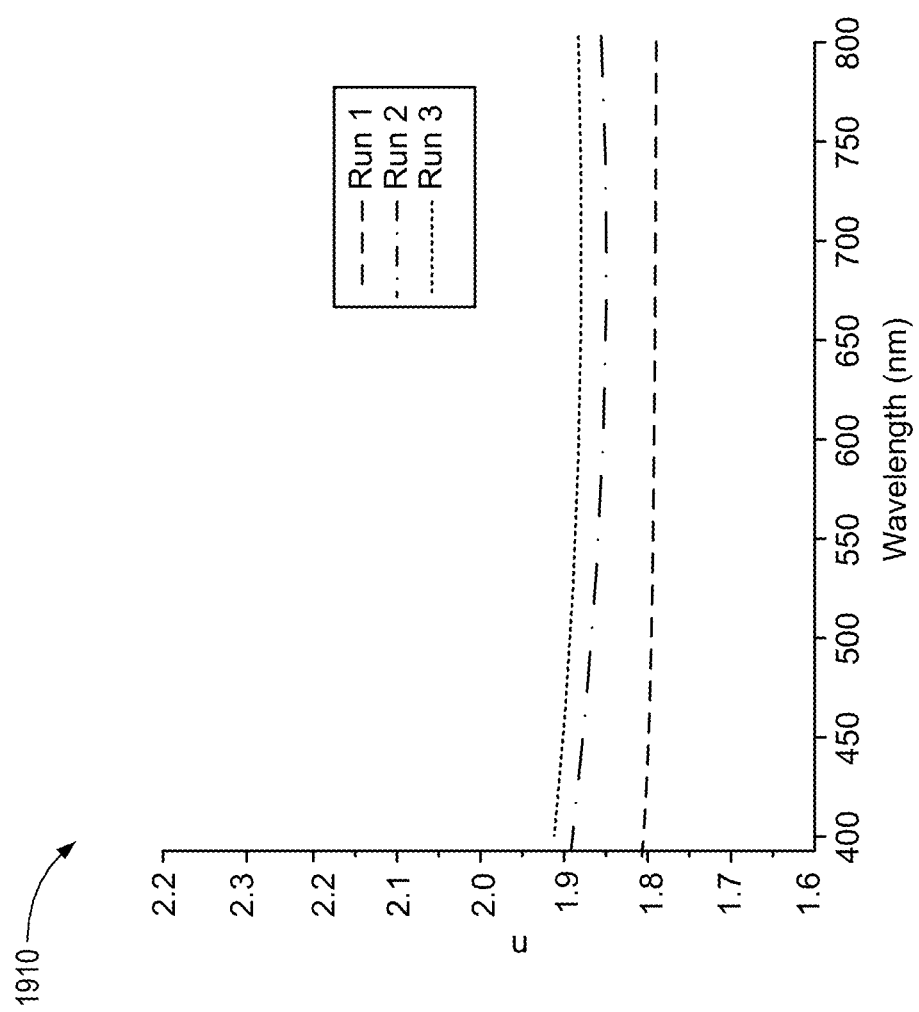
FIG. 19 illustrates a graph of the refractive index values (n) of the SRN:H formed using various example ammonia-based PECVD processes, according to one embodiment.

FIG. 19 illustrates a graph 1910 of the refractive index values (n) of the SRN:H formed using various example ammonia-based PECVD processes, according to one embodiment. The extinction coefficients (k) are not graphed since the values are essentially zero across the visible spectrum.

While several example processes and process parameters are described herein for forming SRN:H, it is appreciated that a target (e.g., higher) refractive index (n) and/or a lower extinction coefficient (k) may be obtained by increasing the RF power, adjusting the relative and specific ratios of the gases, modifying the temperature of the substrate upon which the material is being deposited, decreasing the working pressure within the deposition chamber, and/or adjusting the base pressure used for the deposition. Notably, a lower base pressure generally results in a higher purity of SRN:H (e.g., due to the decreased oxygen within the chamber). A PECVD chamber may reduce the base pressure within a chamber to 0.000002 Torr. Lower pressures may be preferable but, if not available, nitrogen gas may be used to purge the chamber and process the wafer to reduce oxygen contamination. In some embodiments, the chamber may be cleaned or purged from contaminants by introducing tetrafluoromethane or carbon tetrafluoride ($CF_4$), argon (Ar), nitrogen ($N_2$), and/or nitrous oxide ($N_2O$).

As detailed herein, SRN may be deposited using $NH_3$; however, this may introduce N—H bonds that are detrimental to the formation of SRN:H. Accordingly, $N_2$ may be used instead of $NH_3$ as the precursor of the nitrogen source, with a separate source of $H_2$ introduced during the process. Since high temperatures (e.g., temperatures greater than approximately 350 degrees Celsius) can break Si—H bonds, lower temperatures may be used to promote bonding between Si—H in the thin film.

In some embodiments, the PECVD process for forming a-Si:H and/or SRN:H may include a plasma warm-up phase during which the plasma is warmed up (e.g., for one or more minutes) to ensure a more uniform plasma field, which results in a more uniform film deposition. As it pertains to SRN and/or SRN:H, the presently described systems and methods benefit from the identification during testing that higher silicon content can result in a material with an index of refraction (n) that is greater than 2.0. Higher nitrogen content can decrease the index of refraction (n) to below 2.0 and is therefore less useful for metasurface formation. N—H bonds introduced when forming SRN:H through ammonia-based PECVD processes result in higher K bonds. Accordingly, the nitrogen-based PECVD (ammonia-less) PECVD process may be preferred in embodiments in which higher indices of refraction (n) are desired in a metasurface. Temperatures greater than approximately 300 degrees Celsius reduce the $H_2$ content within the SRN:H, which results in higher coefficient of extinction (k) values. Accordingly, temperatures below 300 degrees Celsius may be utilized to reduce the coefficient of extinction (k) of the SRN:H.

This disclosure has been made with reference to various embodiments, including the best mode. However, those skilled in the art will recognize that changes and modifications may be made to the various embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. This disclosure should be understood to encompass at least the following claims, which are included as a part of this disclosure. The scope of the present disclosure should, therefore, be interpreted to encompass at least the following clauses and the claims filed herewith.

Clause 1. A method to manufacture a high-index, optically transparent hydrogenated amorphous silicon (a-Si:H) material using a plasma-enhanced chemical vapor deposition (PECVD) process with process parameters that include: a radio frequency (RF) power of at least 30 Watts; a flow rate of hydrogen (H2) between 75 and 200 standard cubic centimeters per minute (sccm); and a flow rate of silane (SiH4) between 8 and 12 sccm, wherein the a-Si:H material has an index of refraction (n) greater than 3.0 and an extinction coefficient (k) less than 0.1 for optical wavelengths between 485 nanometers and 650 nanometers.

Clause 2. The method of clause 1, wherein the PECVD process utilizes a deposition temperature between 140 and 160 degrees Celsius.

Clause 3. The method of clause 1, wherein the PECVD process utilizes a deposition duration of between 40 and 60 minutes.

Clause 4. The method of clause 1, wherein the PECVD process utilizes a deposition pressure less than 1600 millitorr (mTorr).

Clause 5. The method of clause 1, wherein the radio frequency (RF) power of the PECVD process is 40 Watts, wherein the flow rate of hydrogen ($H_2$) used in the PECVD process is between 90 and 150 sccm, wherein the flow rate of silane ($SiH_4$) used in the PECVD process is 10 sccm, wherein the PECVD process utilizes a deposition temperature of 150 degrees Celsius, and wherein the PECVD process utilizes a deposition pressure of 1500 millitorr (mTorr).

Clause 6. The method of clause 1, wherein the radio frequency (RF) power of the PECVD process is greater than 60 Watts.

Clause 7. A method to manufacture a high-index, optically transparent hydrogenated amorphous silicon (a-Si:H) material using a sputtering deposition process with process parameters that include: a sputtering power between 90 and 150 Watts; a flow rate of hydrogen ($H_2$) between 180 and 220 standard cubic centimeters per minute (sccm); and a flow rate of argon (Ar) between 20 and 100 sccm, wherein the a-Si:H material has an index of refraction (n) greater than 2.8 and an extinction coefficient (k) less than 0.4 for optical wavelengths between 485 nanometers and 650 nanometers.

Clause 8. The method of clause 7, wherein the sputtering process utilizes a substrate temperature of between 165 and 185 degrees Celsius.

Clause 9. The method of clause 7, wherein the sputtering deposition process utilizes a deposition duration of between 45 and 65 minutes.

Clause 10. The method of clause 7, wherein the sputtering deposition process utilizes a working pressure of between 4 and 5 millitorr (mT).

Clause 11. The method of clause 7, wherein the sputtering deposition process utilizes a sputtering power of 150 Watts, wherein the flow rate of hydrogen (H2) used in the sputtering deposition process is 200 sccm, wherein the flow rate of argon (Ar) used in the sputtering deposition process is 100 sccm, and wherein the sputtering deposition process utilizes a deposition temperature of 175 degrees Celsius.

Clause 12. A method to manufacture a high-index, optically transparent silicon-rich nitride (SRN) material using a low-pressure chemical vapor deposition (LPCVD) process with process parameters that include: a flow rate of dichlorosilane (DCS) between 100 and 120 standard cubic centimeters per minute (sccm); a flow rate of ammonia (NH3) between 15 and 25 standard cubic centimeters per minute (sccm); and a pressure between 200 and 250 millitorr (mTorr), wherein the SRN material has an index of refraction (n) greater than 2.3 and an extinction coefficient (k) less than 0.01 for optical wavelengths between 485 nanometers and 650 nanometers.

Clause 13. The method of clause 12, wherein the LPCVD process utilizes a deposition temperature between 800 and 850 degrees Celsius.

Clause 14. The method of clause 12, wherein the LPCVD process utilizes a deposition duration of between 70 and 90 minutes.

Clause 15. A method to manufacture a high-index, optically transparent hydrogenated silicon-rich nitride (SRN:H) material using a plasma-enhanced chemical vapor deposition (PECVD) process with process parameters that include: a radio frequency (RF) power of at least 200 Watts; and a flow rate of nitrogen (N2) of at least 150 standard cubic centimeters per minute (sccm); a flow rate of silane (SiH4) of at least 35 sccm; wherein the SRN:H material has an index of refraction (n) greater than 1.8 and an extinction coefficient (k) less than 0.1 for optical wavelengths between 485 nanometers and 650 nanometers.

Clause 16. The method of clause 15, wherein the PECVD process parameters further include: a flow rate of hydrogen (H2) between 100 and 200 sccm; and a flow rate of argon (Ar) of at least 500 sccm, and wherein the SRN:H material has an index of refraction (n) greater than 2.1 and an extinction coefficient (k) less than 0.1 for optical wavelengths between 485 nanometers and 650 nanometers.

Clause 17. The method of clause 15, wherein the PECVD process parameters further include a flow rate of ammonia (NH3) between 10 and 40 sccm.

Clause 18. The method of clause 15, wherein the PECVD process utilizes a deposition temperature less than 300 degrees Celsius.

Clause 19. The method of clause 15, wherein the PECVD process utilizes a deposition duration of less than 10 minutes.

Clause 20. The method of clause 15, wherein the PECVD process utilizes a deposition pressure less than 1600 millitorr (mTorr).

Clause 21. The method of clause 1, wherein the radio frequency (RF) power of the PECVD process is 40 Watts, wherein the flow rate of hydrogen (H2) used in the PECVD process is between 90 and 150 sccm, wherein the flow rate of silane (SiH4) used in the PECVD process is 10 sccm, wherein the PECVD process utilizes a deposition temperature of 150 degrees Celsius, and wherein the PECVD process utilizes a deposition pressure of 1500 millitorr (mTorr).

Clause 22. The method of clause 1, wherein the radio frequency (RF) power of the PECVD process is greater than 60 Watts.

Clause 23. An optical metalens, comprising: an array of hydrogenated silicon-based deflector elements with varying diameters that extend from a substrate with a repeating pattern of hydrogenated silicon-based deflector element diameters, wherein interelement on-center spacings of the hydrogenated silicon-based deflector elements are selected as a function of a wavelength within an operational bandwidth of the optical metalens, and wherein each hydrogenated silicon-based deflector element has a height and a width that are each less than a smallest wavelength within the operational bandwidth.

Clause 24. The optical metalens of clause 23, wherein the hydrogenated silicon-based deflector elements have an index of refraction (n) greater than 2.3 and an extinction coefficient (k) less than 0.4 for optical wavelengths between 485 nanometers and 650 nanometers.

Clause 25. The optical metalens of clause 23, wherein the array of hydrogenated silicon-based deflector elements comprises a two-dimensional array of hydrogenated silicon-based deflector elements.

Clause 26. The optical metalens of clause 23, wherein each of the hydrogenated silicon-based deflector elements comprises a cylinder having a diameter (D), a height (H), and an on-center nearest neighbor interelement spacing (P), wherein the diameter (D) of each hydrogenated silicon-based deflector element varies based on the relative location of the hydrogenated silicon-based deflector element in the repeating pattern.

Clause 27. The optical metalens of clause 23, wherein the hydrogenated silicon-based deflector elements comprise hydrogenated silicon-rich nitride (SRN:H) deflector elements.

Clause 28. The optical metalens of clause 27, wherein the SRN:H deflector elements are manufactured using a deposition process with process parameters selected such that the SRN:H deflector elements have an index of refraction (n) greater than 2.3 and an extinction coefficient (k) less than 0.01 for optical wavelengths between 485 nanometers and 650 nanometers.

Clause 29. The optical metalens of clause 23, wherein the hydrogenated silicon-based deflector elements comprise hydrogenated amorphous silicon (a-Si:H) deflector elements.

Clause 30. The optical metalens of clause 29, wherein the a-Si:H deflector elements are manufactured using a deposition process with process parameters selected such that the a-Si:H deflector elements have an index of refraction (n) greater than 2.8 and an extinction coefficient (k) less than 0.4 for optical wavelengths between 485 nanometers and 650 nanometers.

Clause 31. A method to manufacture a metalens, comprising: depositing a hydrogenated amorphous silicon (a-Si:H) layer on a substrate using one of a sputtering deposition process and a plasma-enhanced chemical vapor deposition (PECVD) process; coating the a-Si:H layer with a photoresist; developing the photoresist with a mask pattern corresponding to a target array of pillar diameters of a metalens; and etching the a-Si:H layer according to the developed photoresist mask pattern to generate a-Si:H pillars extending from the substrate with a target height.

Clause 32. The method of clause 31, wherein the a-Si:H layer is deposited on the substrate using the PECVD process.

Clause 33. The method of clause 32, wherein the PECVD process is implemented using process parameters that include: a radio frequency (RF) power between 30 and 60 Watts; a flow rate of hydrogen (H2) between 75 and 200 standard cubic centimeters per minute (sccm); and a flow rate of silane (SiH4) between 8 and 12 sccm.

Clause 34. The method of clause 32, wherein the PECVD process is implemented using process parameters that include: a radio frequency (RF) power greater than 60 Watts; a flow rate of hydrogen (H2) between 75 and 200 standard cubic centimeters per minute (sccm); and a flow rate of silane (SiH4) between 8 and 12 sccm.

Clause 35. The method of clause 31, wherein the a-Si:H layer is deposited on the substrate using the sputtering deposition process.

Clause 36. The method of clause 35, wherein the sputtering deposition process is implemented using process parameters that include: a sputtering power between 90 and 150 Watts; a flow rate of hydrogen (H2) between 180 and 220 standard cubic centimeters per minute (sccm); and a flow rate of argon (Ar) between 20 and 100 sccm.

Clause 37. An optical system, comprising: a waveguide; an optical source to generate optical radiation incident on a first face of the waveguide at an angle of incidence at which the optical radiation passes through the waveguide and out of a second face of the waveguide that is opposite the first face of the waveguide; and a metasurface on the second face of the waveguide to receive the optical radiation that passes through the waveguide from the optical source, wherein the metasurface is operable to reflect the optical radiation back into the waveguide at an angle greater than a critical angle for total internal reflection within the waveguide, such that the optical radiation is conveyed along a length of the waveguide, wherein the metasurface comprises a one-dimensional array of hydrogenated silicon-based ridges that extend along a dimension perpendicular to the length of the waveguide.

Clause 38. The system of clause 37, wherein the hydrogenated silicon-based ridges have an index of refraction (n) greater than 2.3 and an extinction coefficient (k) less than 0.4 for optical wavelengths between 485 nanometers and 650 nanometers.

Clause 39. The system of clause 37, wherein the hydrogenated silicon-based ridges comprise hydrogenated silicon-rich nitride (SRN:H) ridges.

Clause 40. The system of clause 37, wherein the hydrogenated silicon-based ridges comprise hydrogenated silicon-rich nitride (SRN:H) ridges, wherein the SRN:H ridges are formed using a deposition process with process parameters selected such that the SRN:H ridges have an index of refraction (n) greater than 2.3 and an extinction coefficient (k) less than 0.01 for optical wavelengths between 485 nanometers and 650 nanometers.

Clause 41. The system of clause 40, wherein the metasurface comprises: a slanted grating of angled ridges of SRN:H extending parallel to one another along a width of the waveguide and perpendicular to the length of the waveguide; and a reflective metallic layer over the array of angled ridges of SRN:H.

Clause 42. The system of clause 41, wherein each angled ridge of SRN:H of the slanted grating comprises: a base face that is co-planar with the second face of the waveguide; a height face that extends from the base face to a ridge height with an internal angle greater than 60 degrees relative to the base face; and an angled face that extends between an edge of the base face and an edge of the height face at a target internal angle less than 25 degrees relative to the base face.

Clause 43. The system of clause 42, wherein the target internal angle of the angled face of each angled ridge of the slanted grating relative to the base face of each respective angled ridge of the slanted grating is between 15 and 25 degrees.

Clause 44. The system of clause 37, wherein the hydrogenated silicon-based ridges comprise hydrogenated amorphous silicon (a-Si:H) ridges.

Clause 45. The system of clause 44, wherein the metasurface comprises: a slanted grating of angled ridges of a-Si:H extending parallel to one another along a width of the waveguide and perpendicular to the length of the waveguide; and a reflective metallic layer over the array of angled ridges of a-Si:H.

Clause 46. The system of clause 45, wherein each angled ridge of a-Si:H of the slanted grating comprises: a base face that is co-planar with the second face of the waveguide; a height face that extends from the base face to a ridge height with an internal angle greater than 60 degrees relative to the base face; and an angled face that extends between an edge of the base face and an edge of the height face at a target internal angle less than 25 degrees relative to the base face.

Clause 47. The system of clause 46, wherein the target internal angle of the angled face of each angled ridge of the slanted grating relative to the base face of each respective angled ridge of the slanted grating is between 15 and 25 degrees.

Clause 48. The system of clause 37, wherein the hydrogenated silicon-based ridges comprise hydrogenated amorphous silicon (a-Si:H) ridges, wherein the a-Si:H ridges are formed using a deposition process with process parameters selected such that the a-Si:H ridges have an index of refraction (n) greater than 2.8 and an extinction coefficient (k) less than 0.4 for optical wavelengths between 485 nanometers and 650 nanometers.

Clause 49. The system of clause 48, wherein the metasurface comprises: a slanted grating of angled ridges of a-Si:H extending parallel to one another along a width of the waveguide and perpendicular to the length of the waveguide; and a reflective metallic layer over the array of angled ridges of a-Si:H.

Clause 50. The system of clause 49, wherein each angled ridge of a-Si:H of the slanted grating comprises: a base face that is co-planar with the second face of the waveguide; a height face that extends from the base face to a ridge height with an internal angle greater than 60 degrees relative to the base face; and an angled face that extends between an edge of the base face and an edge of the height face at a target internal angle less than 25 degrees relative to the base face.

Clause 51. The system of clause 50, wherein the target internal angle of the angled face of each angled ridge of the slanted grating relative to the base face of each respective angled ridge of the slanted grating is between 15 and 25 degrees.

Clause 52. A method to manufacture a metasurface waveguide coupler, comprising: depositing a hydrogenated amorphous silicon (a-Si:H) layer on a planar face of a waveguide substrate; depositing a conductive layer on the a-Si:H layer; coating the conductive layer with a photoresist; processing the photoresist to define a plurality of elongated rectangular cuboids of photoresist that extend orthogonally with respect to the planar face of the waveguide substrate; etching to remove the conductive layer between the elongated rectangular cuboids of photoresist; partially etching the a-Si:H layer between the elongated rectangular cuboids of photoresist to a target depth; removing the photoresist to expose a plurality of elongated rectangular ridges of a-Si:H extending from an initial base layer of a-Si:H having an initial thickness; ion beam etching the a-Si:H layer at an angle relative to the planar face of the waveguide substrate for additive formation of a slanted grating of elongated angled ridges of a-Si:H; and depositing a metallic reflective layer over the slanted grating of elongated angled ridges of a-Si:H.

Clause 53. The method of clause 52, wherein each elongated angled ridge of a-Si:H comprises: a base face that is co-planar with the planar face of the waveguide substrate; a height face that extends from the base face to a ridge height with an internal angle greater than 60 degrees relative to the base face; and an angled face that extends between an edge of the base face and an edge of the height face at a target internal angle less than 25 degrees relative to the base face.

Clause 54. A metasurface, comprising: an array of silicon-based elements with varying diameters that extend from a substrate, wherein interelement on-center spacings of the hydrogenated silicon-based elements are selected as a function of a wavelength within an operational bandwidth of the metasurface, and wherein each silicon-based element has a height and a width that are each less than a smallest wavelength within the operational bandwidth, wherein the silicon-based deflector elements have an index of refraction (n) greater than 2.3 and an extinction coefficient (k) less than 0.4 for optical wavelengths between 485 nanometers and 650 nanometers.

Clause 55. The metasurface of clause 54, wherein the metasurface comprises one of: an optical metalens and a metasurface formed on a waveguide to couple optical radiation into the waveguide.

Clause 56. The metasurface of clause 54, wherein the silicon-based elements comprise one of: silicon-rich nitride (SRN) elements, hydrogenated silicon-rich nitride (SRN:H) elements, and hydrogenated amorphous silicon (a-Si:H) elements.

Clause 57. The metasurface of clause 54, wherein the silicon-based elements comprise one of: a two-dimensional array of silicon-based pillars and a one-dimensional array of silicon-based angled ridges.

What is claimed is:

1. An optical system, comprising:
   a waveguide;
   an optical source to generate optical radiation incident on a first face of the waveguide at an angle of incidence at which the optical radiation passes through the waveguide and out of a second face of the waveguide that is opposite the first face of the waveguide; and
   a metasurface on the second face of the waveguide to receive the optical radiation that passes through the waveguide from the optical source, wherein the metasurface is operable to reflect the optical radiation back into the waveguide at an angle greater than a critical angle for total internal reflection within the waveguide, such that the optical radiation is conveyed along a length of the waveguide,
   wherein the metasurface comprises a one-dimensional array of hydrogenated silicon-based ridges that extend along a dimension perpendicular to the length of the waveguide.

2. The system of claim 1, wherein the hydrogenated silicon-based ridges comprise hydrogenated silicon-rich nitride (SRN:H) ridges, wherein the SRN:H ridges are formed using a deposition process with process parameters selected such that the SRN:H ridges have an index of refraction (n) greater than 2.3 and an extinction coefficient (k) less than 0.01 for optical wavelengths between 485 nanometers and 650 nanometers.

3. The system of claim 2, wherein the metasurface comprises:
   a slanted grating of angled ridges of SRN:H extending parallel to one another along a width of the waveguide and perpendicular to the length of the waveguide; and
   a reflective metallic layer over the array of angled ridges of SRN:H.

4. The system of claim 3, wherein each angled ridge of SRN:H of the slanted grating comprises:
   a base face that is co-planar with the second face of the waveguide;
   a height face that extends from the base face to a ridge height with an internal angle greater than 60 degrees relative to the base face; and
   an angled face that extends between an edge of the base face and an edge of the height face at a target internal angle less than 25 degrees relative to the base face.

5. The system of claim 4, wherein the target internal angle of the angled face of each angled ridge of the slanted grating relative to the base face of each respective angled ridge of the slanted grating is between 15 and 25 degrees.

6. The system of claim 1, wherein the hydrogenated silicon-based ridges comprise hydrogenated amorphous silicon (a-Si:H) ridges, wherein the a-Si:H ridges are formed using a deposition process with process parameters selected such that the a-Si:H ridges have an index of refraction (n) greater than 2.8 and an extinction coefficient (k) less than 0.4 for optical wavelengths between 485 nanometers and 650 nanometers.

7. The system of claim 6, wherein the metasurface comprises:
- a slanted grating of angled ridges of a-Si:H extending parallel to one another along a width of the waveguide and perpendicular to the length of the waveguide; and
- a reflective metallic layer over the array of angled ridges of a-Si:H.

8. The system of claim 7, wherein each angled ridge of a-Si:H of the slanted grating comprises:
- a base face that is co-planar with the second face of the waveguide;
- a height face that extends from the base face to a ridge height with an internal angle greater than 60 degrees relative to the base face; and
- an angled face that extends between an edge of the base face and an edge of the height face at a target internal angle less than 25 degrees relative to the base face.

9. The system of claim 8, wherein the target internal angle of the angled face of each angled ridge of the slanted grating relative to the base face of each respective angled ridge of the slanted grating is between 15 and 25 degrees.

10. The system of claim 1, wherein the hydrogenated silicon-based ridges comprise hydrogenated silicon nitride ($SiN_x$:H) ridges.

11. The system of claim 10, wherein the metasurface comprises:
- a slanted grating of angled ridges of $SiN_x$:H extending parallel to one another along a width of the waveguide and perpendicular to the length of the waveguide; and
- a reflective metallic layer over the array of angled ridges of $SiN_x$:H.

12. The system of claim 11, wherein each angled ridge of $SiN_x$:H of the slanted grating comprises:
- a base face that is co-planar with the second face of the waveguide;
- a height face that extends from the base face to a ridge height with an internal angle greater than 60 degrees relative to the base face; and
- an angled face that extends between an edge of the base face and an edge of the height face at a target internal angle less than 25 degrees relative to the base face.

13. The system of claim 12, wherein the target internal angle of the angled face of each angled ridge of the slanted grating relative to the base face of each respective angled ridge of the slanted grating is between 15 and 25 degrees.

14. The system of claim 1, wherein the hydrogenated silicon-based ridges comprise hydrogenated silicon-rich nitride (SRN:H) ridges.

15. The system of claim 1, wherein the hydrogenated silicon-based ridges comprise hydrogenated amorphous silicon (a-Si:H) ridges.

\* \* \* \* \*